United States Patent
Deng et al.

(10) Patent No.: US 12,015,707 B2
(45) Date of Patent: Jun. 18, 2024

(54) COMMUNICATION METHOD AND RELATED PRODUCT

(71) Applicant: Huawei Technologies Co., Ltd., Shenzhen (CN)

(72) Inventors: Juan Deng, Hangzhou (CN); Chengdong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 17/380,961

(22) Filed: Jul. 20, 2021

(65) Prior Publication Data

US 2021/0351925 A1 Nov. 11, 2021

Related U.S. Application Data

(63) Continuation of application No. PCT/CN2020/073317, filed on Jan. 20, 2020.

(30) Foreign Application Priority Data

Jan. 21, 2019 (CN) .......................... 201910055000.4

(51) Int. Cl.
*H04L 9/08* (2006.01)
*H04W 12/041* (2021.01)
(Continued)

(52) U.S. Cl.
CPC .......... *H04L 9/0891* (2013.01); *H04W 12/041* (2021.01); *H04W 12/0433* (2021.01); *H04W 60/00* (2013.01); *H04W 88/08* (2013.01)

(58) Field of Classification Search
CPC ............ H04L 9/0891; H04W 12/0433; H04W 12/041; H04W 60/00; H04W 88/08
See application file for complete search history.

(56) References Cited

U.S. PATENT DOCUMENTS 10,542,428 B2 * 1/2020 Ben Henda ....... H04W 12/0433
11,363,524 B2 * 6/2022 Garcia Azorero ...... H04W 8/08
(Continued)

FOREIGN PATENT DOCUMENTS

CN      108966220 A    12/2018
CN      109005540 A    12/2018
(Continued)

OTHER PUBLICATIONS

Ericsson, "New key issue on key separation between Network Slices," 3GPP TSG SA WG3 (Security) Meeting #93 Spokane(US), S3-183809 (revision of S3-183583), total 2 pages, 3rd Generation Partnership Project, Valbonne, France (Nov. 12-16, 2018).

(Continued)

*Primary Examiner* — Catherine Thiaw
(74) *Attorney, Agent, or Firm* — Leydig, Voit & Mayer, Ltd.

(57) ABSTRACT

A communication method and a related product are provided. The communication method includes: When UE switches from a source slice to a target slice mutually exclusive with the source slice, both the UE and a target AMF serving the target slice can obtain a first AMF key Kamf_new. The first AMF key Kamf_new is different from a second AMF key Kamf, and the second AMF key Kamf is a key of a source AMF serving the source slice. According (Continued)

to the application communication security and effectiveness are significantly improved_in a mutually exclusive slice switching scenario.

18 Claims, 13 Drawing Sheets

(51) Int. Cl.
*H04W 12/0433* (2021.01)
*H04W 60/00* (2009.01)
*H04W 88/08* (2009.01)

(56) References Cited

U.S. PATENT DOCUMENTS

| | | | | |
|---|---|---|---|---|
| 2010/0064344 | A1* | 3/2010 | Wang | H04W 12/04 |
| | | | | 380/44 |
| 2012/0077501 | A1* | 3/2012 | Zhang | H04L 63/06 |
| | | | | 455/436 |
| 2018/0317157 | A1* | 11/2018 | Baek | H04W 28/16 |
| 2018/0332523 | A1* | 11/2018 | Faccin | H04W 36/0033 |
| 2018/0343249 | A1* | 11/2018 | Hahn | H04L 63/0869 |
| 2019/0029065 | A1* | 1/2019 | Park | H04W 8/08 |
| 2019/0037454 | A1* | 1/2019 | Lee | H04W 36/00837 |
| 2019/0053148 | A1* | 2/2019 | Lee | H04W 48/18 |
| 2019/0150081 | A1* | 5/2019 | Qiao | H04W 48/16 |
| | | | | 370/329 |
| 2019/0166493 | A1* | 5/2019 | You | H04W 12/40 |
| 2019/0200285 | A1* | 6/2019 | Velev | H04W 48/18 |
| 2019/0230556 | A1* | 7/2019 | Lee | H04W 28/16 |
| 2019/0274072 | A1* | 9/2019 | Prasad | H04W 12/0431 |
| 2019/0349838 | A1* | 11/2019 | Futaki | H04W 88/02 |
| 2019/0373461 | A1* | 12/2019 | Ito | H04W 12/106 |
| 2020/0252862 | A1* | 8/2020 | Kim | H04W 8/08 |
| 2020/0280435 | A1* | 9/2020 | Lehtovirta | H04L 9/0822 |
| 2020/0314924 | A1* | 10/2020 | Bischinger | H04W 48/18 |

FOREIGN PATENT DOCUMENTS

| | | |
|---|---|---|
| CN | 109151933 A | 1/2019 |
| EP | 3576446 A1 | 12/2019 |
| WO | 2018121880 A1 | 7/2018 |
| WO | 2018138347 A1 | 8/2018 |
| WO | 2018236819 A1 | 12/2018 |
| WO | WO2018236819 * 12/2018 | ............ H04W 12/02 |

OTHER PUBLICATIONS

Huawei, Hisilicon, "KAMF Derivation when AMF set changes," 3GPP TSG SA WG3 (Security) Meeting #89, Reno, USA, S3-173238 revision of S3-17xabc, total 6 pages, 3rd Generation Partnership Project, Valbonne, France (Nov. 27-Dec. 1, 2017).

Ericsson, "Update of solution #1.36 for SEAF realization via AMF," 3GPP TSG SA WG3 (Security) Meeting #86Bis Busan, Korea, S3-170778, total 4 pages, 3rd Generation Partnership Project, Valbonne, France (Mar. 27-31, 2017).

"3rd Generation Partnership Project; Technical Specification Group Services and System Aspects; Study on architecture enhancements to support Proximity-based Services (ProSe) (Release 12)," 3GPP TR 23.703 V12.0.0, total 324 pages, 3rd Generation Partnership Project, Valbonne, France (Feb. 2014).

Ericsson, "Update of solution #1.36 for SEAF realization via AMF (KI #1.2)," 3GPP TSG SA WG3 (Security) Meeting #87, Ljubljana, Slovenia, S3-171283, total 5 pages (May 15-19, 2017).

Ericsson, "Update of solution #1.36 for SEAF realization via AMF," 3GPP TSG SA WG3 (Security) Meeting #86Bis Busan, Korea, S3-170778, total 5 pages, 3rd Generation Partnership Project, Valbonne, France (Mar. 27-31, 2017).

"3rd Generation Partnership Project; Technical Specification Group Services and System Aspects; Study on Enhancement of Network Slicing (Release 16)," 3GPP TR 23.740 V16.0.0, total 70 pages, 3rd Generation Partnership Project, Valbonne, France (Dec. 2018).

Secretary of SA WG2, "Draft Report of SA WG2 meetings #128BIS," SA WG2 Meeting #S2-129, S2-1810002, Dongguan, P.R. China, total 577 pages (Oct. 15-19, 2018).

Nokia, "Evolution scenario for AMF and SEAF from 5G phase 1 to later phases," 3GPP TSG SA WG3 (Security) Meeting #86Bis, Busan, Korea, S3-170636, total 3 pages, 3rd Generation Partnership Project, Valbonne, France (Mar. 27-31, 2017).

"3rd Generation Partnership Project; Technical Specification Group Services and System Aspects; Security architecture and procedures for 5G system (Release 15)," 3GPP TS 33.501 V15.3.1, total 181 pages, 3rd Generation Partnership Project, Valbonne, France (Dec. 2018).

Ericsson, "Identifier for Kausf," Change Request, 3GPP TSG-SA WG3 Meeting #91, Belgrade (Serbia), S3-181356, total 15 pages (Apr. 16-20, 2018).

* cited by examiner

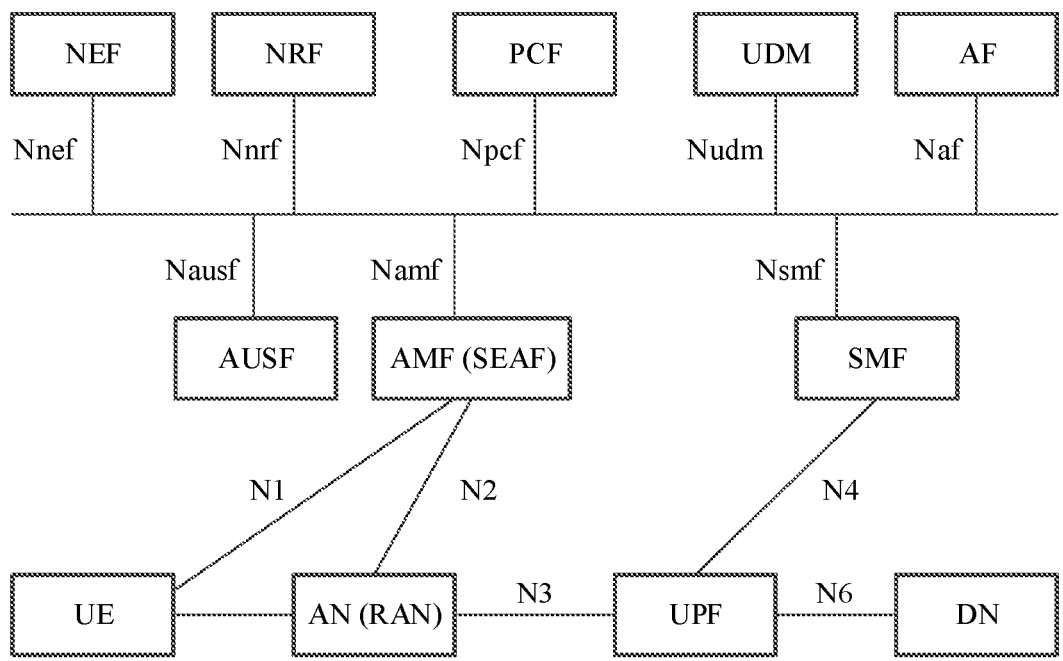
FIG. 1-A
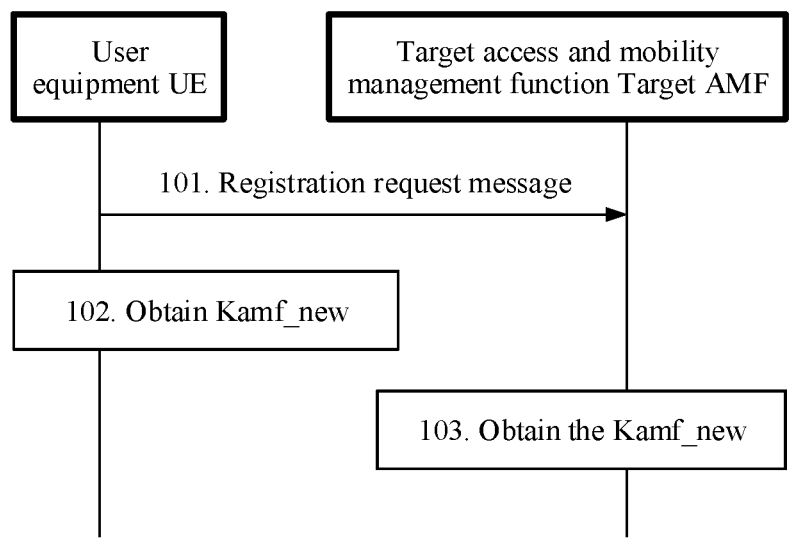
FIG. 1-B

COMMUNICATION METHOD AND RELATED PRODUCT

CROSS-REFERENCE TO RELATED APPLICATIONS

This application is a continuation of International Application No. PCT/CN2020/073317, filed on Jan. 20, 2020, which claims priority to Chinese Patent Application No. 201910055000.4, filed on Jan. 21, 2019. The disclosures of the aforementioned applications are hereby incorporated by reference in their entireties.

TECHNICAL FIELD

Embodiments of this application relates to the field of communications technologies, and in particular, to a communication method and a related product.

BACKGROUND

In a communications network such as a 5G network, mutually exclusive slices may be defined as: When single network slice assistance information (S-NSSAI) of each of two network slices is in subscription data of user equipment (UE), and when the UE cannot access the two S-NSSAIs at the same time, the two network slices are mutually exclusive for the UE. Therefore, the two network slices may be mutually referred to as mutually exclusive slices.

There are many application examples of the mutually exclusive slices. For example, an internal regulation of some companies, departments, operators or the like prohibits UE from accessing a "regular" service and a "special" service at the same time. Specifically, for example, UE used by an officer of a particular agency is restricted to be only in an off-duty mode (regular) or an on-duty mode (special), and it is stipulated that the UE is prohibited from accessing an off-duty service and an on-duty service at the same time.

When UE switches from a network slice 1 to a network slice 2 mutually exclusive with slice 1, a network side reallocates an access and mobility management function (AMF). How to ensure forward security of Kamf in a slice switching process is a problem that needs to be considered.

SUMMARY

Embodiments of this application provide a communication method and a related product.

According to a first aspect, a communication method is provided, including: when UE switches from a source slice to a target slice mutually exclusive with the source slice, the UE sends a registration request message, where the registration request message carries network slice selection assistance information (NSSAI) of the target slice requested by the UE; and the UE obtains a first AMF key Kamf_new, where the Kamf_new is different from a second AMF key Kamf_old, the Kamf_new is a key of a target AMF serving the target slice, and the Kamf_old is a key of a source AMF serving the source slice.

It can be learned that in the foregoing solution in the embodiments of this application, when the UE switches from a source slice to a target slice mutually exclusive with the source slice, the UE obtains the first AMF key Kamf_new, where the Kamf_new is different from the second AMF key Kamf_old. Because the Kamf_new is different from the Kamf_old, key isolation between the source AMF and the target AMF can be implemented in a scenario of switching mutually exclusive slices, thereby implementing forward security of Kamf.

In some possible implementations, before the UE obtains the first AMF key Kamf_new, the method may further include: The UE receives a first message that carries a key input parameter and that is sent by the target AMF, where the key input parameter carried in the first message is used to generate the Kamf_new.

The key input parameter carried in the first message includes, for example, one or more of the following key input parameters: a key input parameter T2, a key input parameter T3, and a key input parameter T4. The key input parameter T2 is provided, for example, by the target AMF; the key input parameter T3 is provided, for example, by an AUSF; the key input parameter T4 is provided, for example, by an SEAF; and the key input parameter T5 is provided, for example, by an AAA-S.

In some possible implementations, before the UE obtains the first AMF key Kamf_new, the method may further include: receiving a second message that carries a first key update indication and that is sent by the target AMF, where the first key update indication is used to indicate the UE to update an AMF key. Correspondingly, for example, that the UE obtains the first AMF key Kamf_new may be performed under triggering of the first key update indication.

For example, the second message and the first message may be a same message, or may be different messages. For example, the second message and the first message may be a non-access stratum security mode control (NAS Security Mode Command) message or another message.

In some possible implementations, the registration request message may carry a key input parameter T1, where the key input parameter T1 is used to generate the Kamf_new. For example, the key input parameter T1 is provided by the UE, and the UE transfers the key input parameter T1 to a network side by using the registration request message, so that the network side generates the Kamf_new based on the key input parameter T1.

In some possible implementations, the registration request message carries a second key update indication, where the second key update indication is used to indicate the network side to update an AMF key. Correspondingly, for example, that a network-side related device obtains the first AMF key Kamf_new may be performed under triggering of the second key update indication.

According to a second aspect, a communication method is provided, including: When UE switches from a source slice to a target slice mutually exclusive with the source slice, a target AMF serving the target slice receives a registration request message from the UE, where the registration request message carries network slice selection assistance information NSSAI of the target slice requested by the UE; and the target AMF obtains a first AMF key Kamf_new, where the first AMF key Kamf_new is different from a second AMF key Kamf_old, the Kamf_new is a key of the target AMF, and the Kamf_old is a key of a source AMF serving the source slice.

In some possible implementations, the registration request message further carries a second key update indication, where the second key update indication is used to indicate a network side to update an AMF key; or the target AMF obtains the Kamf_new is performed when determining that a locally preset key update condition is met.

In some possible implementations, the registration request message carries a key input parameter T1, where the key input parameter T1 is used to generate the Kamf_new. Certainly, other key input parameters may also be used to generate the Kamf_new.

In some possible implementations, after the target AMF receives the registration request message from the UE, the method may further include:

The target AMF sends a key update service request to an authentication server function AUSF, where the key update service request carries the key input parameter T1 and/or a key input parameter T2; and the target AMF receives a response that is specific to the key update service request and that is returned by the AUSF, where the response carries an SEAF key Kseaf_new, the key input parameter T1 and/or the key input parameter T2 are/is used to generate the Kseaf_new, and the Kseaf_new is used to generate the Kamf_new. Further, the target AMF may send, to the UE, a first message that carries some or all key input parameters (for example, the key input parameter T2) used to generate the Kseaf_new.

In some possible implementations, after the target AMF receives the registration request message from the UE, the method may further include:

The target AMF sends a key update service request to an AUSF; the target AMF receives a response that is specific to the key update service request and that is returned by the AUSF, where the response carries the Kseaf_new and a key input parameter T3, the key input parameter T3 is used to generate the Kseaf_new, and the Kseaf_new is used to generate the Kamf_new; and the target AMF sends, to the UE, a first message that carries the key input parameter T3.

In some possible implementations, after the target AMF receives the registration request message from the UE, the method may further include:

The target AMF sends a key update service request to an AUSF, where the key update service request carries a key input parameter T2 and/or the key input parameter T1; the target AMF receives a response that is specific to the key update service request and that is returned by the AUSF, where the response carries the Kseaf_new and a key input parameter T3, the key input parameter T3 and the key input parameter that is carried in the key update service request are used to generate the Kseaf_new, and the Kseaf_new is used to generate the Kamf_new; and the target AMF sends, to the UE, a first message that carries the key input parameter T3.

In some possible implementations, after the target AMF receives the registration request message from the UE, the method may further include:

The target AMF sends, a key update service request to a security anchor function SEAF, where the key update service invocation request carries a key input parameter T2 and/or the key input parameter T1; and the target AMF receives a response that is specific to the key update service request and that is returned by the SEAF, where the response carries the Kamf_new, and the key input parameter T2 and/or the key input parameter T1 are/is used to generate the Kamf_new. Further, the target AMF may send, to the UE, a first message that carries some or all key input parameters (for example, the key input parameter T2) used to generate the Kamf_new.

In some possible implementations, after the target AMF receives the registration request message from the UE, the method may further include:

The target AMF sends a key update service request to the SEAF; the target AMF receives a response that is specific to the key update service request and that is returned by the SEAF, where the response carries the Kamf_new and a key input parameter T4, and the key input parameter T4 is used to generate the Kamf_new; and the target AMF sends, to the UE, a first message that carries the key input parameter T4.

In some possible implementations, after the target AMF receives the registration request message from the UE, the method may further include:

The target AMF sends a key update service request to an SEAF, where the key update service request carries a key input parameter T2 and/or the key input parameter T1; the target AMF receives a response that is specific to the key update service request and that is returned by the SEAF, where the response carries the Kamf_new and a key input parameter T4, and the key input parameter T4 and the key input parameter that is carried in the key update service are used to generate the Kamf_new; and the target AMF sends, to the UE, a first message that carries the key input parameter T4.

In some possible implementations, after the target AMF receives the registration request message from the UE, the method may further include:

The target AMF sends, to a slice authentication and authorization server AAA-S, a message that carries a key parameter indication, where the key parameter indication is used to indicate the AAA-S to generate a key input parameter T5; and the target AMF receives the key generation parameter T5 sent by the AAA-S, where the key input parameter T5 is used to generate the Kamf_new; or the target AMF sends, to an AAA-S, a message that carries a key parameter indication, where the key parameter indication is used to indicate the AAA-S to generate a key input parameter T5; and the target AMF receives the key generation parameter T5 sent by the AAA-S, where the key input parameter T5 is used to generate the Kamf_new, and the key input parameter T1 and/or the key input parameter T2 are/is further used to generate the Kamf_new.

According to a third aspect, a communication method is provided, including:

When UE switches from a source slice to a target slice mutually exclusive with the source slice, an AUSF generates Kseaf_new after receiving a key update service request from a target AMF, where the Kseaf_new is used to generate Kamf_new, the Kamf_new is different from a second AMF key Kamf_old, the Kamf_new is a key of the target AMF serving the target slice, and the Kamf_old is a key of a source AMF serving the source slice; and the AUSF returns a response to the key update service request to the target AMF, where the response carries the Kseaf_new, and the Kseaf_new is used to generate the Kamf_new.

One or more of a key input parameter T1, a key input parameter T2, and a key input parameter T3 are used to generate the Kseaf_new.

When the key input parameter T1 and/or the key input parameter T2 are/is used to generate the Kseaf_new, the key input parameter T1 and/or the key input parameter T2 are/is carried in the key update service request.

When the key input parameter T3 is used to generate the Kseaf_new, the response to the key update service request carries the key input parameter T3.

According to a fourth aspect, a communication method is provided, including:

When UE switches from a source slice to a target slice mutually exclusive with the source slice, after receiving a key update service request of an SEAF from a target AMF, the SEAF generates Kamf_new, where the Kamf_new is different from a second AMF key Kamf_old, the Kamf_new is a key of the target AMF serving the target slice, and the Kamf_old is a key of a source AMF serving the source slice; and the SEAF returns a response to the key update service to the target AMF, where the response carries the Kamf_new.

One or more of a key input parameter T1, a key input parameter T2, and a key input parameter T4 are used to generate the Kamf_new.

When the key input parameter T1 and/or the key input parameter T2 are/is used to generate the Kamf_new, the key input parameter T1 and/or the key input parameter T2 are/is carried in the key update service request.

When the key input parameter T4 is used to generate Kseaf_new, the response to the key update service request carries the key input parameter T4.

According to a fifth aspect, user equipment UE is provided, including:

a transceiver unit, configured to send a registration request message when the UE switches from a source slice to a target slice mutually exclusive with the source slice, where the registration request message carries network slice selection assistance information NSSAI of the target slice requested by the UE; and a processing unit, configured to obtain a first AMF key Kamf_new, where the Kamf_new is different from a second AMF key Kamf_old, the Kamf_new is a key of a target AMF serving the target slice, and the Kamf_old is a key of a source AMF serving the source slice.

In some possible implementations, the transceiver unit is further configured to: before obtaining the first AMF key Kamf_new, receive a first message that carries a key input parameter and that is sent by the target AMF, where the key input parameter is used to generate the Kamf_new.

In some possible implementations, the transceiver unit is further configured to: before obtaining the first AMF key Kamf_new, receive a second message that carries a first key update indication and that is sent by the target AMF, where the first key update indication is used to indicate the UE to update an AMF key.

In some possible implementations, the registration request message carries a key input parameter T1, where the key input parameter T1 is used to generate the Kamf_new.

In some possible implementations, the registration request message carries a second key update indication, where the second key update indication is used to indicate a network side to update an AMF key.

According to a sixth aspect, a target AMF is provided, including:

a transceiver unit, configured to: when UE switches from a source slice to a target slice mutually exclusive with the source slice, receive a registration request message from the UE, where the registration request message carries network slice selection assistance information NSSAI of the target slice requested by the UE; and a processing unit, configured to obtain a first AMF key Kamf_new, where the first AMF key Kamf_new is different from a second AMF key Kamf_old, the Kamf_new is a key of the target AMF, the target AMF is an AMF serving the target slice, and the Kamf_old is a key of a source AMF serving the source slice.

In some possible implementations, the registration request message further carries a second key update indication, where the second key update indication is used to indicate a network side to update an AMF key; or the target AMF obtains the Kamf_new when determining that a locally preset key update condition is met.

In some possible implementations, the registration request message carries a key input parameter T1, where the key input parameter T1 is used to generate the Kamf_new.

In some possible implementations, the transceiver unit is further configured to: after receiving the registration request message from the UE, send a key update service request to an authentication server function AUSF, where the key update service request carries the key input parameter T1 and/or a key input parameter T2; and receive a response that is specific to the key update service request and that is returned by the AUSF, where the response carries an SEAF key Kseaf_new, the key input parameter T1 and/or the key input parameter T2 are/is used to generate the Kseaf_new, and the Kseaf_new is used to generate the Kamf_new.

Further, the transceiver unit may be further configured to send, to the UE, a first message that carries some or all key input parameters (for example, the key input parameter T2) used to generate the Kseaf_new.

In some possible implementations, the transceiver unit is further configured to: after receiving the registration request message from the UE, send a key update service request to an AUSF; receive a response that is specific to the key update service request and that is returned by the AUSF, where the response carries the Kseaf_new and a key input parameter T3, the key input parameter T3 is used to generate the Kseaf_new, and the Kseaf_new is used to generate the Kamf_new; and send, to the UE, a first message that carries the key input parameter T3.

In some possible implementations, the transceiver unit is further configured to: after receiving the registration request message from the UE, send a key update service request to an AUSF, where the key update service request carries a key input parameter T2 and/or the key input parameter T1; receive a response that is specific to the key update service request and that is returned by the AUSF, where the response carries the Kseaf_new and a key input parameter T3, the key input parameter T3 and the key input parameter that is carried in the key update service request are used to generate the Kseaf_new, and the Kseaf_new is used to generate the Kamf_new; and send, to the UE, a first message that carries the key input parameter T3.

In some possible implementations, the transceiver unit is further configured to: after receiving the registration request message from the UE, send a key update service request to a security anchor function SEAF, where the key update service request carries a key input parameter T2 and/or the key input parameter T1; and receive a response that is specific to the key update service request and that is returned by the SEAF, where the response carries the Kamf_new, and the key input parameter T2 and/or the key input parameter T1 are/is used to generate the Kamf_new. Further, the transceiver unit may be further configured to send, to the UE, a first message that carries some or all key input parameters (for example, the key input parameter T2) used to generate the Kamf_new.

In some possible implementations, the transceiver unit is further configured to: after receiving the registration request message from the UE, send a key update service request to an SEAF; receive a response that is specific to the key update service request and that is returned by the SEAF, where the response carries the Kamf_new and a key input parameter T4, and the key input parameter T4 is used to generate the Kamf_new; and send, to the UE, a first message that carries the key input parameter T4.

In some possible implementations, the transceiver unit is further configured to: after receiving the registration request message from the UE, send a key update service request to an SEAF, where the key update service request carries a key input parameter T2 and/or the key input parameter T1; receive a response that is specific to the key update service request and that is returned by the SEAF, where the response carries the Kamf_new and a key input parameter T4, and the key input parameter T4 and the key input parameter that is carried in the key update service request are used to generate the Kamf_new; and send, to the UE, a first message that carries the key input parameter T4.

In some possible implementations, the transceiver unit is further configured to: after receiving the registration request message from the UE, send, to a slice authentication and authorization server (AAA-S), a message that carries a key parameter indication, where the key parameter indication is used to indicate the AAA-S to generate a key input parameter T5; and receive the key generation parameter T5 sent by the AAA-S, where the key input parameter T5 may be used to generate the Kamf_new; or the target AMF sends, to an AAA-S, a message that carries a key parameter indication, where the key parameter indication is used to indicate the AAA-S to generate a key input parameter T5; and the target AMF receives the key generation parameter T5 sent by the AAA-S, where the key input parameter T5 is used to generate the Kamf_new, and the key input parameter T1 and/or the key input parameter T2 are/is further used to generate the Kamf_new.

According to a seventh aspect, an authentication server function AUSF is provided, including:

a processing unit, configured for the AUSF to: when UE switches from a source slice to a target slice mutually exclusive with the source slice, generate Kseaf_new after receiving a key update service request from a target AMF, where the Kseaf_new is used to generate Kamf_new, the Kamf_new is different from a second AMF key Kamf_old, the Kamf_new is a key of the target AMF serving the target slice, and the Kamf_old is a key of a source AMF serving the source slice; and a transceiver unit, configured to return a response to the key update service request to the target AMF, where the response carries the Kseaf_new, and the Kseaf_new is used to generate the Kamf_new.

One or more of a key input parameter T1, a key input parameter T2, and a key input parameter T3 are used to generate the Kseaf_new.

When the key input parameter T1 and/or the key input parameter T2 are/is used to generate the Kseaf_new, the key input parameter T1 and/or the key input parameter T2 are/is carried in the key update service request of the AUSF.

When the key input parameter T3 is used to generate the Kseaf_new, the response to the key update service request carries the key input parameter T3.

According to an eighth aspect, a security anchor function SEAF is provided, including:

a processing unit, configured to: when UE switches from a source slice to a target slice mutually exclusive with the source slice, generate, by the SEAF, Kamf_new after receiving a key update service request from a target AMF, where the Kamf_new is different from a second AMF key Kamf_old, the Kamf_new is a key of the target AMF serving the target slice, and the Kamf_old is a key of a source AMF serving the source slice; and a transceiver unit, configured to return a response to the key update service request to the target AMF, where the response carries the Kamf_new.

One or more of a key input parameter T1, a key input parameter T2, and a key input parameter T4 are used to generate the Kamf_new.

When the key input parameter T1 and/or the key input parameter T2 are/is used to generate the Kamf_new, the key input parameter T1 and/or the key input parameter T2 are/is carried in the key update service request of the SEAF.

When the key input parameter T4 is used to generate Kseaf_new, the response to the key update service request carries the key input parameter T4.

In the foregoing examples, the key input parameter T1, the key input parameter T2, the key input parameter T3, the key input parameter T4, and the key input parameter T5 are mentioned. The key input parameter T1 may be provided, for example, by the UE; the key input parameter T2 may be provided, for example, by the target AMF; the key input parameter T3 may be provided, for example, by the AUSF; the key input parameter T4 may be provided, for example, by the SEAF; and the key input parameter T5 may be provided, for example, by the AAA-S.

According to a ninth aspect, user equipment is provided, including a processor and a memory that are coupled to each other, where the processor is configured to invoke a computer program stored in the memory, to perform some or all steps performed by UE in any method provided in the embodiments of this application.

According to a tenth aspect, a computer-readable storage medium is provided, where the computer-readable storage medium stores a computer program, and the computer program is executed by a processor, to complete some or all steps performed by UE in any method provided in the embodiments of this application.

According to an eleventh aspect, a target AMF is provided, including a processor and a memory that are coupled to each other, where the processor is configured to invoke a computer program stored in the memory, to perform some or all steps performed by the target AMF in any method provided in the embodiments of this application.

According to a twelfth aspect, a computer-readable storage medium is provided, where the computer-readable storage medium stores a computer program, and the computer program is executed by a processor, to complete some or all steps performed by a target AMF in any method provided in the embodiments of this application.

According to a thirteenth aspect, an AUSF is provided, including a processor and a memory that are coupled to each other, where the processor is configured to invoke a computer program stored in the memory, to perform some or all steps performed by the AUSF in any method provided in the embodiments of this application.

According to a fourteenth aspect, a computer-readable storage medium is provided, where the computer-readable storage medium stores a computer program, and the computer program is executed by a processor, to complete some or all steps performed by an AUSF in any method provided in the embodiments of this application.

According to a fifteenth aspect, an SEAF is provided, including a processor and a memory that are coupled to each other, where the processor is configured to invoke a computer program stored in the memory, to perform some or all steps performed by the SEAF in any method provided in the embodiments of this application.

According to a sixteenth aspect, a computer-readable storage medium is provided, where the computer-readable storage medium stores a computer program, and the computer program is executed by a processor, to complete some or all steps performed by an SEAF in any method provided in the embodiments of this application.

According to a seventeenth aspect, a communication method is provided, including:

When UE switches from a source slice to a target slice mutually exclusive with the source slice, a slice authentication and authorization server AAA-S receives a message that carries a key parameter indication from a target AMF, where the key parameter indication is used to indicate the AAA-S to generate a key input parameter T5; and generating the key input parameter T5; and sending the key generation parameter T5 to the target AMF, where the key input parameter T5 may be used to generate a first AMF key Kamf_new, the first AMF key Kamf_new is different from a second AMF key Kamf_old, the Kamf_new is a key of the target AMF, the target AMF is an AMF serving the target slice, and the Kamf_old is a key of a source AMF serving the source slice.

According to an eighteenth aspect, a slice authentication and authorization server AAA-S is provided, including:

a transceiver unit, configured to: when UE switches from a source slice to a target slice mutually exclusive with the source slice, receive a message that carries a key parameter indication from a target AMF, where the key parameter indication is used to indicate the AAA-S to generate a key input parameter T5; and a processing unit, configured to generate the key input parameter T5.

The transceiver unit is further configured to send the key generation parameter T5 to the target AMF, where the key input parameter T5 may be used to generate a first AMF key Kamf_new, the first AMF key Kamf_new is different from a second AMF key Kamf_old, the Kamf_new is a key of the target AMF, the target AMF is an AMF serving the target slice, and the Kamf_old is a key of a source AMF serving the source slice.

According to a nineteenth aspect, a slice authentication and authorization server AAA-S is provided, including a processor and a memory that are coupled to each other, where the processor is configured to invoke a computer program stored in the memory, to perform some or all steps performed by the AAA-S in any method provided in the embodiments of this application.

According to a twentieth aspect, a computer-readable storage medium is provided, where the computer-readable storage medium stores a computer program, and the computer program is executed by a processor, to complete some or all steps performed by an AAA-S in any method provided in the embodiments of this application.

According to a twenty-first aspect, an embodiment of this application provides a computer program product including instructions. When the computer program product is run on a computer device, the computer device may perform some or all steps of any method performed by using any device provided in the embodiments of this application.

BRIEF DESCRIPTION OF DRAWINGS

The following describes some accompanying drawings in the embodiments of this application.

FIG. 1-A is a schematic structural diagram of a communications system according to an embodiment of this application;

FIG. 1-B is a schematic flowchart of a communication method according to an embodiment of this application;

DESCRIPTION OF EMBODIMENTS

Figure 2:
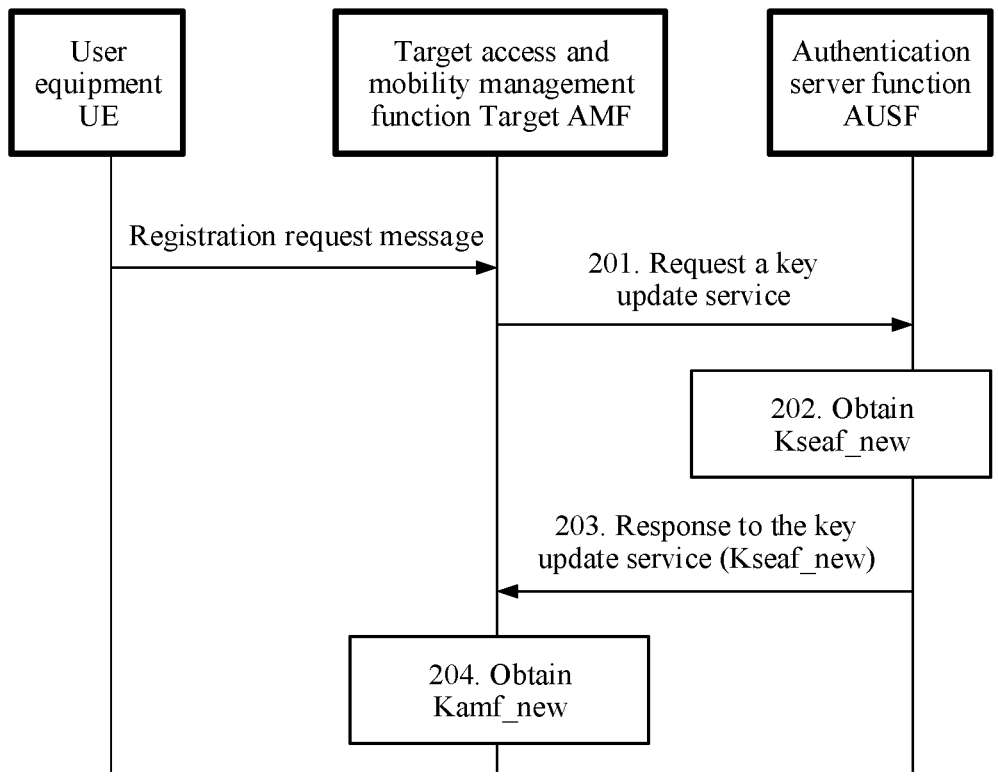
FIG. 2 is a schematic flowchart of another communication method according to an embodiment of this application.

The following describes the embodiments of this application with reference to the accompanying drawings in the embodiments of this application.

FIG. 1-A is a schematic diagram of an example of a 5G network architecture according to an embodiment of this application. A 5G network splits some functional network elements (for example, a mobility management entity (MME)) of a 4G network in a way, and defines an architecture based on a service-oriented architecture. In the network architecture shown in FIG. 1-A, a function similar to the MME in the 4G network is split into an access and mobility management function (AMF), a session management function (SMF), and the like.

The following describes some other related network elements/entities.

A user terminal (UE) accesses a data network (DN) or the like by accessing an operator network, and uses a service provided by an operator or a third party on the DN.

The access and mobility management function (AMF) is a control plane network element in a 3GPP network, and is mainly responsible for access control and mobility management for the UE to access the operator network. A security anchor function (SEAF) may be deployed in the AMF, or an SEAF may be deployed in another device different from the AMF. In FIG. 1-A, an example in which the SEAF is deployed in the AMF is used. When the SEAF is deployed in the AMF, the SEAF and the AMF are collectively referred to as an AMF.

The session management function (SMF) is a control plane network element in the 3GPP network. The SMF is mainly responsible for managing a data packet (PDU) session of the UE. The PDU session is a channel for transmitting PDUs. The UE and the DN may send PDUs to each other by using the PDU session. The SMF is responsible for managing, such as establishing, maintaining, and deleting, the PDU session.

The data network (DN) is also referred to as a packet data network (PDN), and is a network outside the 3GPP network. The 3GPP network may access a plurality of DNs, and a plurality of types of services provided by an operator or a third party may be deployed on the DN. For example, a DN is a private network of a smart factory, a sensor installed in a workshop of the smart factory acts as UE, and a control server of the sensor is deployed in the DN. The UE communicates with the control server. After obtaining an instruction of the control server, the UE may transfer collected data to the control server based on the instruction. For another example, a DN is an internal office network of a company, a terminal used by an employee of the company may act as UE, and the UE may access internal information and other resources of the company.

A unified data management network element (UDM) is also a control plane network element in the 3GPP network. The UDM is mainly responsible for storing subscription data, a credential, a subscriber permanent identifier (SUPI) and the like of a subscriber (UE) in the 3GPP network. The data may be used for authentication and authorization of the UE to access the 3GPP network of the operator.

An authentication server function (AUSF) is also a control plane network element in the 3GPP network. The AUSF is mainly responsible for level-1 authentication (namely, authentication of the 3GPP network for a subscriber).

A network exposure function (NEF) is also a control plane network element in the 3GPP network. The NEF is mainly responsible for exposing an external interface of the 3GPP network to a third party in a secure manner. When a network element such as the SMF needs to communicate with a third-party network element, the NEF may be used as a relay for communication. During relay, the NEF may translate internal and external identifiers. For example, when sending an SUPI of the UE from the 3GPP network to a third party, the NEF may translate the SUPI into a corresponding external identity (ID). Conversely, when an external identity ID is sent to the 3GPP network, the NEF may translate the external identity ID into a corresponding SUPI.

A network repository function (NRF) is also a control plane network element in the 3GPP network, and is mainly responsible for storing a configuration service profile of an accessible network function (NF), and providing a network function discovery service for another network element.

A user plane function (UPF) is a gateway for communication between the 3GPP network and the DN.

A policy control function (PCF) is a control plane function in the 3GPP network, and is configured to provide a PDU session policy for the SMF. The policy may include charging, quality of service (QoS), an authorization-related policy, and the like.

An access network (AN) is a sub-network of the 3GPP network. To access the 3GPP network, the UE first needs to pass through the AN. In a radio access scenario, the AN is also referred to as a radio access network (RAN). Therefore, the terms RAN and AN are often used without distinction.

The 3GPP network is a network that complies with 3GPP specifications. The part other than the UE and the DN in FIG. 1-A may be considered as the 3GPP network. The 3GPP network is not limited to a 5G network defined in the 3GPP, and may also include a 2G network, a 3G network, and a 4G network. Generally, the 3GPP network is operated by an operator. In addition, in the architecture shown in FIG. 1-A, N1, N2, N3, N4, N6 and the like respectively represent reference points between related network elements/network functions. Nausf, Namf and the like respectively represent service-oriented interfaces of the related network functions. The technical solutions in the embodiments of this application may be specifically implemented based on a communications system in the example of the architecture shown in FIG. 1-A or a deformed architecture of a communications system.

The embodiments of this application provide some solutions for implementing secure communication in an AMF reallocation case, for example, a solution for implementing forward security.

Forward security: An AMF serving Slice 1 (network slice 1), namely, a source AMF, cannot obtain an AMF key Kamf between the UE and a target AMF. Backward security: An AMF serving Slice 2 (network slice 2), namely, the target AMF, cannot obtain an AMF key Kamf between the UE and the source AMF. For example, the network slice 1 and the network slice 2 are two mutually exclusive network slices.

To simplify description, in some embodiments of this application, a network slice is sometimes referred to as a "slice" for short. In other words, a slice and a network slice are sometimes used without distinction.

The following uses some specific embodiments for description.

FIG. 1-B is a schematic flowchart of a communication method according to an embodiment of this application. The communication method may include the following steps.

101. When UE switches from a source slice to a target slice mutually exclusive with the source slice, the UE sends a registration request message to a target AMF, where the registration request message carries network slice selection assistance information (NSSAI) of the target slice requested by the UE.

Correspondingly, a target AMF serving the target slice receives the registration request message from the UE.

102. The UE obtains a first AMF key Kamf_new.

103. The target AMF obtains the first AMF key Kamf_new.

The Kamf_new is different from a second AMF key Kamf_old, the Kamf_new is a key of a target AMF serving the target slice, and the Kamf_old is a key of a source AMF serving the source slice.

There is no necessary sequence between step 102 and step 103.

In some possible implementations, before the UE obtains the first AMF key Kamf_new, the method may further include: The UE receives a first message that carries a key input parameter and that is sent by the target AMF, where the key input parameter carried in the first message is used to generate the Kamf_new.

The key input parameter carried in the first message includes, for example, one or more of the following key input parameters: a key input parameter T2, a key input parameter T3, and a key input parameter T4. The key input parameter T2 is provided, for example, by the target AMF; the key input parameter T3 is provided, for example, by an AUSF; the key input parameter T4 is provided, for example, by an SEAF; and the key input parameter T5 is provided, for example, by an AAA-S.

In some possible implementations, before the UE obtains the first AMF key Kamf_new, the method may further include: receiving a second message that carries a first key update indication and that is sent by the target AMF, where the first key update indication is used to indicate the UE to update an AMF key. Correspondingly, for example, that the UE obtains the first AMF key Kamf_new may be performed under triggering of the first key update indication.

For example, the second message and the first message may be a same message, or may be different messages. For example, the second message and the first message may be a non-access stratum security mode control (NAS Security Mode Command) message or another message.

In some possible implementations, the registration request message may carry a key input parameter T1, where the key input parameter T1 is used to generate the Kamf_new. For example, the key input parameter T1 is provided by the UE, and the UE transfers the key input parameter T1 to a network side by using the registration request message, so that the network side generates the Kamf_new based on the key input parameter T1.

In some possible implementations, the registration request message further carries a second key update indication, where the second key update indication is used to indicate the network side to update an AMF key. Correspondingly, for example, that a network-side related device obtains the first AMF key Kamf_new may be performed under triggering of the second key update indication.

It can be learned that, in the foregoing solution in this embodiment, key isolation between the source AMF and the target AMF can be implemented in a slice switching scenario, thereby implementing forward security of Kamf.

In some possible implementations, after the target AMF receives the registration request message from the UE, the method may further include:

The target AMF sends a key update service request to an authentication server function AUSF (the target AMF sends the key update service request to the authentication server function AUSF to invoke a key update service of the AUSF), where the key update service request carries the key input parameter T1 and/or a key input parameter T2; and the target AMF receives a response that is specific to the key update service request and that is returned by the AUSF, where the response carries an SEAF key Kseaf_new, the key input parameter T1 and/or the key input parameter T2 are/is used to generate the Kseaf_new, and the Kseaf_new is used to generate the Kamf_new. Further, the target AMF may send, to the UE, a first message that carries some or all key input parameters (for example, the key input parameter T2) used to generate the Kseaf_new.

In some possible implementations, after the target AMF receives the registration request message from the UE, the method may further include:

The target AMF sends a key update service request to an AUSF; the target AMF receives a response that is specific to the key update service request and that is returned by the AUSF, where the response carries the Kseaf_new and a key input parameter T3, the key input parameter T3 is used to generate the Kseaf_new, and the Kseaf_new is used to generate the Kamf_new; and the target AMF sends, to the UE, a first message that carries the key input parameter T3.

In some possible implementations, after the target AMF receives the registration request message from the UE, the method may further include:

The target AMF sends a key update service request to an AUSF, where the key update service request carries a key input parameter T2 and/or the key input parameter T1; the target AMF receives a response that is specific to the key update service request and that is returned by the AUSF, where the response carries the Kseaf_new and a key input parameter T3, the key input parameter T3 and the key input parameter that is carried in the key update service request are used to generate the Kseaf_new, and the Kseaf_new is used to generate the Kamf_new; and the target AMF sends, to the UE, a first message that carries the key input parameter T3.

In some possible implementations, after the target AMF receives the registration request message from the UE, the method may further include:

The target AMF sends, a key update service request to a security anchor function SEAF, where the key update service invocation request carries a key input parameter T2 and/or the key input parameter T1; and the target AMF receives a response that is specific to the key update service request and that is returned by the SEAF, where the response carries the Kamf_new, and the key input parameter T2 and/or the key input parameter T1 are/is used to generate the Kamf_new. Further, the target AMF may send, to the UE, a first message that carries some or all key input parameters (for example, the key input parameter T2) used to generate the Kamf_new.

In some possible implementations, after the target AMF receives the registration request message from the UE, the method may further include:

The target AMF sends a key update service request to the SEAF; the target AMF receives a response that is specific to the key update service request and that is returned by the SEAF, where the response carries the Kamf_new and a key input parameter T4, and the key input parameter T4 is used to generate the Kamf_new; and the target AMF sends, to the UE, a first message that carries the key input parameter T4.

In some possible implementations, after the target AMF receives the registration request message from the UE and for requesting to access the target slice, the method may further include:

The target AMF sends a key update service request to an SEAF, where the key update service request carries a key input parameter T2 and/or the key input parameter T1; the target AMF receives a response that is specific to the key update service request and that is returned by the SEAF, where the response carries the Kamf_new and a key input parameter T4, and the key input parameter T4 and the key input parameter that is carried in the key update service are used to generate the Kamf_new; and the target AMF sends, to the UE, a first message that carries the key input parameter T4. In addition, the first message may further carry some or all other key input parameters used to generate the Kamf_new.

In some possible implementations, after the target AMF receives the registration request message from the UE, the method may further include:

The target AMF sends, to a slice authentication and authorization server AAA-S, a message that carries a key parameter indication, where the key parameter indication is used to indicate the AAA-S to generate a key input parameter T5; and the target AMF receives the key generation parameter T5 sent by the AAA-S, where the key input parameter T5 is used to generate the Kamf_new; or the target AMF sends, to an AAA-S, a message that carries a key parameter indication, where the key parameter indication is used to indicate the AAA-S to generate a key input parameter T5; and the target AMF receives the key generation parameter T5 sent by the AAA-S, where the key input parameter T5 is used to generate the Kamf_new, and the key input parameter T1 and/or the key input parameter T2 are/is further used to generate the Kamf_new.

It can be learned that, in the solution in this embodiment, key isolation between the source AMF and the target AMF can be implemented in a slice switching scenario without updating an entire key system through main authentication. Compared with the solution in which forward security of Kamf is implemented by updating the entire key system through main authentication, related efficiency of the solution in this embodiment of this application is significantly improved.

FIG. 2 is a schematic flowchart of an example of a communication method according to an embodiment of this application. A communication method may include the following steps.

201. When UE switches from a source slice to a target slice mutually exclusive with the source slice, a target AMF sends a key update service request to an AUSF.

The target AMF may request a key update service of the AUSF after receiving a registration request message that is from the UE and that requests to access the target slice.

202. After receiving the key update service request from the target AMF, the AUSF generates Kseaf_new, where the Kseaf_new is used to generate Kamf_new.

One or more of a key input parameter T1, a key input parameter T2, and a key input parameter T3 are used to generate the Kseaf_new.

When the key input parameter T1 and/or the key input parameter T2 are/is used to generate the Kseaf_new, the key input parameter T1 and/or the key input parameter T2 are/is carried in the key update service request.

203. The AUSF returns a response to the key update service request to the target AMF, where the response carries the Kseaf_new.

204. After receiving the response to the key update service request, the target AMF generates Kamf_new by using the Kseaf_new. The Kamf_new is different from a second AMF key Kamf_old, the Kamf_new is a key of a target AMF serving the target slice, and the Kamf_old is a key of a source AMF serving the source slice.

When the key input parameter T3 is used to generate the Kseaf_new, the response to the key update service request carries the key input parameter T3.

It can be learned that, in the foregoing solution in this embodiment, key isolation between the source AMF and the target AMF can be implemented in a slice switching scenario, thereby implementing forward security of Kamf.

It can be learned that, in the solution in this embodiment, key isolation between the source AMF and the target AMF can be implemented in a slice switching scenario by updating the Kseaf_new and the Kamf_new by using the key update service of the AUSF without updating an entire key system through main authentication. Compared with the solution in which forward security of Kamf is implemented by updating the entire key system through main authentication, related efficiency of the solution in this embodiment of this application is significantly improved.

For example, if a main authentication procedure is used, the SEAF requests the AUSF to authenticate the UE. After accepting the request, the AUSF requests a UDM to generate an authentication vector. Based on the authentication vector, the UE, a service network, and a home network perform mutual authentication. A key system of the service network can be updated only after the main authentication succeeds. During the main authentication, the entire key system is updated, and an AUSF key is also updated. In some solutions in this embodiment of this application, the SEAF mainly requests the AUSF to perform key update. The SEAF key and the AMF key are updated. The AUSF key is not updated and the UDM does not need to be involved, so that the related efficiency is significantly improved.

Figure 3:
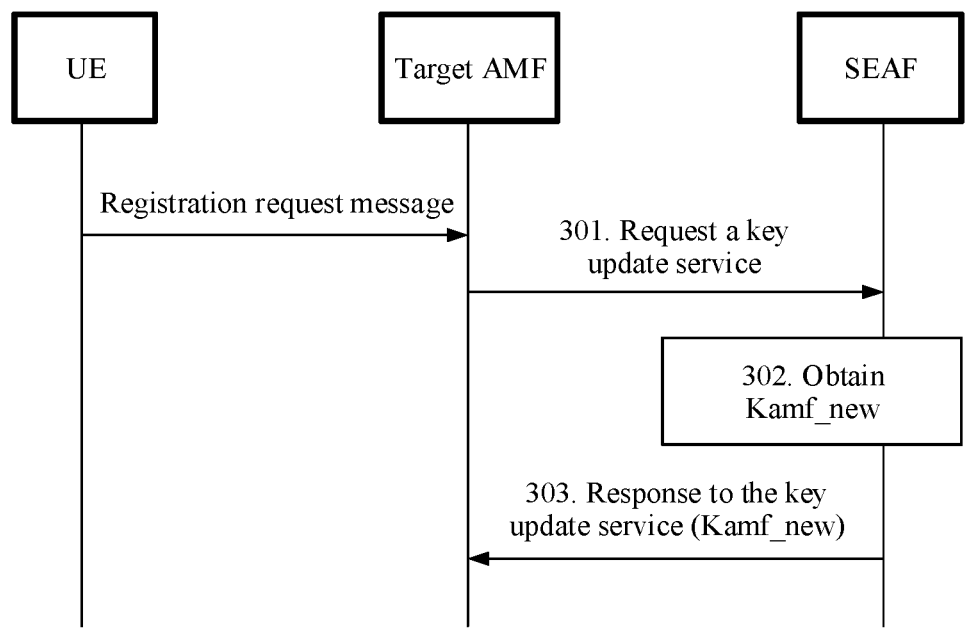
FIG. 3 is a schematic flowchart of another communication method according to an embodiment of this application.

FIG. 3 is a schematic flowchart of an example of another communication method according to an embodiment of this application. Another communication method may include the following steps.

301. When UE switches from a source slice to a target slice mutually exclusive with the source slice, a target AMF sends a key update service request to an SEAF, to request to invoke a key update service of the SEAF.

After receiving a registration request message from the UE, the target AMF may send the key update service request to the SEAF, to request to invoke the key update service of the SEAF.

302. After receiving the key update service request from the target AMF, the SEAF generates Kamf_new. The Kamf_new is different from a second AMF key Kamf_old, the Kamf_new is a key of a target AMF serving the target slice, and the Kamf_old is a key of a source AMF serving the source slice.

One or more of a key input parameter T1, a key input parameter T2, and a key input parameter T4 are used to generate the Kamf_new.

When the key input parameter T1 and/or the key input parameter T2 are/is used to generate the Kamf_new, the key input parameter T1 and/or the key input parameter T2 are/is carried in the key update service request.

303. The SEAF returns a response to the key update service request to the target AMF, where the response carries the Kamf_new.

Correspondingly, the target AMF receives the response that is specific to the key update service request and that is returned by the SEAF, and the target AMF obtains the Kamf_new from the response.

When the key input parameter T4 is used to generate Kseaf_new, the response to the key update service request carries the key input parameter T4. Further, the key input parameter T4 may be transferred to the UE by the target AMF.

It can be learned that, in the foregoing solution in this embodiment, key isolation between the source AMF and the target AMF can be implemented in a slice switching scenario, thereby implementing forward security of Kamf.

In addition, in the solution in this embodiment, key isolation between the source AMF and the target AMF can be implemented in a slice switching scenario by updating the Kamf_new by using the key update service of the SEAF without updating an entire key system through main authentication. Compared with a solution in which forward security of Kamf is implemented by updating the entire key system through main authentication, related efficiency of the solution in this embodiment of this application is significantly improved.

In some embodiments of this application, a condition for triggering to update a key of the target AMF may be: The UE indicates the target AMF to update the key of the target AMF; or the target AMF determines, by determining whether a locally preset key update condition is met, whether the key of the target AMF needs to be updated. A condition for triggering the UE to update a key of the target AMF may be: The UE determines, by determining whether a locally preset key update condition is met, whether the key of the target AMF needs to be updated, or the target AMF indicates the key of the target AMF to the UE.

A network side generates Kamf_new for the target AMF to use. When the network side generates the Kamf_new, different network elements may cooperate. For example, the AUSF generates a new Kseaf, namely, Kseaf_new. The SEAF generates Kamf_new based on the Kseaf_new. For example, the SEAF generates the Kamf_new. For example, the target AMF generates the Kamf_new.

The UE and the network side generate the Kamf_new in a same manner.

For the key input parameter required for generating the Kamf_new, new parameters may be introduced when the Kamf_new is generated, to ensure isolation between the Kamf_new and Kamf of the source AMF (or Kamf generated by horizontal derivation of Kamf).

The key input parameter may include but is not limited to one or more of the following parameters: a random number, a key update Counter, a NAS UL Counter, an identifier of a target slice instance, description information of the target slice instance, an identifier of a slice group or slice class to which the target slice belongs, description information of the slice group or slice class to which the target slice belongs, and the like.

Certainly, parameters used to generate the Kamf_new are actually not specifically limited in this application, provided that the Kamf_new generated by using these parameters is isolated from the Kamf_old of the source AMF (or Kamf generated by horizontal derivation of the Kamf_old).

The following uses some more specific application scenarios for description.

Figure 4:
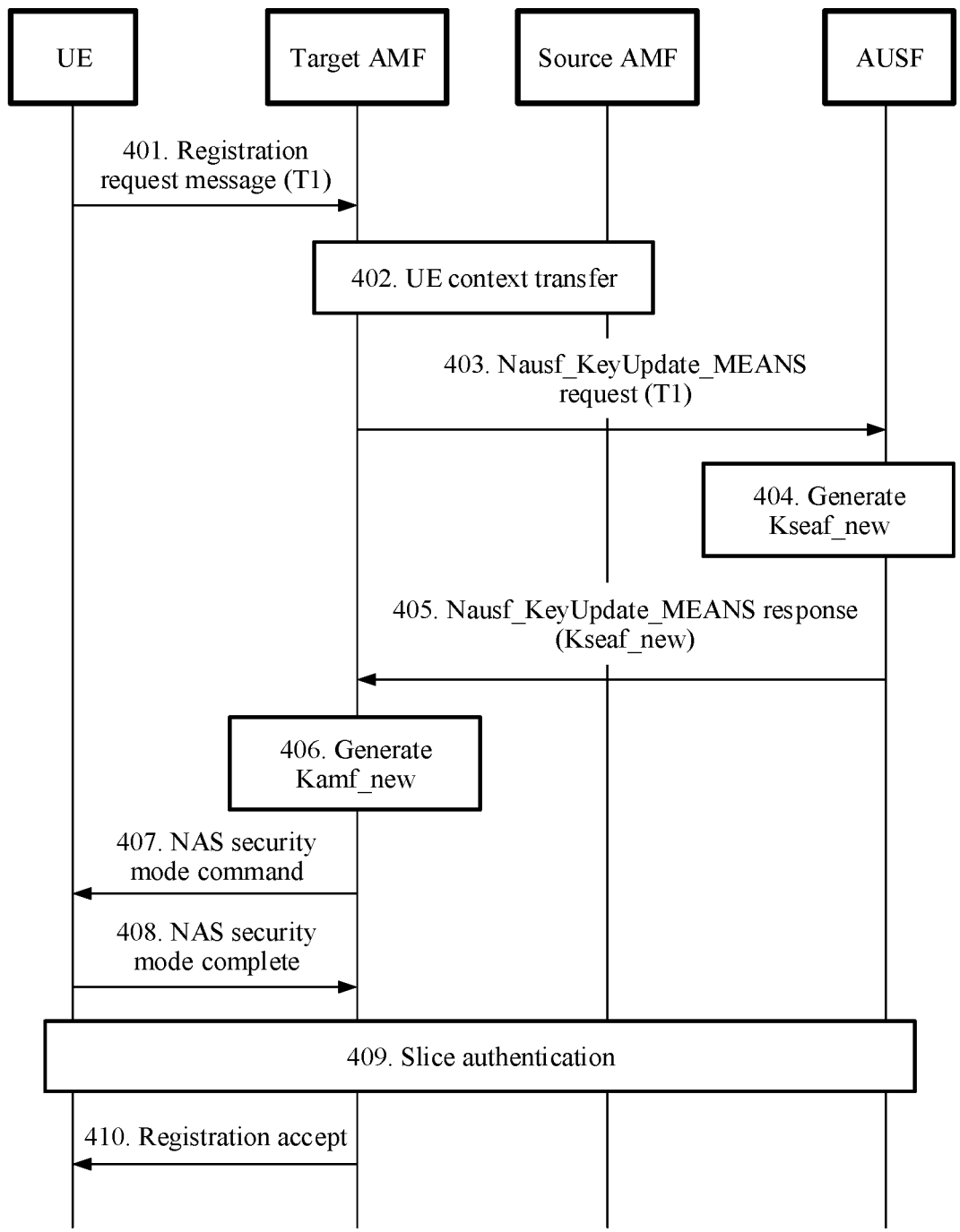
FIG. 4 is a schematic flowchart of another communication method according to an embodiment of this application.

FIG. 4 is a schematic flowchart of another communication method according to an embodiment of this application.

In this embodiment, an example in which an SEAF and an AMF are integrally deployed (in this case, the SEAF and the AMF may be collectively referred to as an AMF) is used. When UE switches from a source slice to a target slice mutually exclusive with the source slice, an AUSF generates Kseaf_new, and sends the generated Kseaf_new to a target AMF (built-in SEAF). The target AMF generates Kamf_new based on the Kseaf_new. Some parameters to be used to generate the Kseaf_new and the Kamf_new are provided by the UE.

As shown in FIG. 4, a communication method may include the following steps.

401. The UE sends a registration request message.

The registration request message carries NSSAI(s) of a target slice that the UE requests to access, and the registration request message further carries a key input parameter T1 that needs to be used to generate a new AMF key Kamf_new.

The key input parameter T1 may include one or more of the following parameters: a random number generated by the UE, a Counter that is synchronously maintained between the UE and the AUSF and that is used for key update, S-NSSAI of the target slice, description information of a slice group (or slice class class) to which the target slice belongs, an identifier of a slice group (or slice class) to which the target slice belongs, description information of a target slice instance, an identifier of the target slice instance, and the like. The key input parameter T1 is used to isolate the finally generated Kamf_new from Kamf_old. A specific type of the key input parameter T1 is not limited in this embodiment of this application, provided that the target input parameter can be met.

Optionally, the registration request message may further carry integrity authentication information Auth_T1 of the key input parameter T1. The Auth_T1 may be used by the AUSF to authenticate whether a source of the key input parameter T1 is the UE, or may be used to authenticate whether the key input parameter T1 is tampered with or the like. An example of the Auth_T1 is as follows: Auth_T1=HMAC (Kausf, key input parameter T1). A specific form of the Auth_T1 is not limited herein, provided that the AUSF can authenticate, by using the Auth_T1, the source of the key input parameter T1 and whether the key input parameter T1 is tampered with.

Optionally, the registration request message may further carry a New_Kseaf_Kamf_Indicator. The UE uses the New_Kseaf_Kamf_Indicator to notify the target AMF that a network side needs to generate the Kseaf_new and the Kamf_new. Certainly, the UE may also notify, in another manner—that the network side needs to generate the Kseaf_new and the Kamf_new.

402. After receiving the registration request, the target AMF initiates a UE context transfer (UE) procedure. The target AMF may obtain a key Kamf_old of a source AMF, and a subscriber permanent identifier (SUPI) and the like of the UE from the source AMF by using the UE Context Transfer procedure.

403. The target AMF sends a key update service request (Nausf_KeyUpdate_MEANS Request) to the AUSF, to request to invoke a key update service of the AUSF.

If the registration request message carries the New_Kseaf_Kamf_Indicator (namely, a Kseaf_Kamf update indication), the target AMF may send the key update service request to the AUSF under the indication of the New_Kseaf_Kamf_Indicator carried in the registration request message, to request to invoke the key update service of the AUSF.

In addition, if the registration request message does not carry the New_Kseaf_Kamf_Indicator, the target AMF may send the key update service request to the AUSF when determining that a preset key update condition is met, to request to invoke the key update service of the AUSF.

The key update service request sent to the AUSF may carry the key input parameter T1 from the registration request message.

The key update service request sent to the AUSF may further carry a subscriber permanent identifier (SUPI) of the UE, a service network name (SN-name), and the like.

If the registration request message carries the integrity authentication information Auth_T1, the key update service request sent to the AUSF further carries the integrity authentication information Auth_T1.

404. The AUSF receives the key update service request from the target AMF.

If the key input parameter T1 carried in the key update service request from the target AMF includes a Counter that is synchronously maintained between the UE and the AUSF and that is used for key update, the AUSF may further detect whether the Counter included in the key input parameter T1 is acceptable. If the Counter is unacceptable, the AUSF may return an error cause to the target AMF and may terminate the subsequent key update procedure.

If the key update service request from the target AMF carries the Auth_T1, the AUSF authenticates the source of the key input parameter T1 and whether the key input parameter T1 is tampered with. If the key input parameter T1 is tampered with, the AUSF may return an error cause to the target AMF and may terminate the subsequent key update procedure.

The AUSF generates the Kseaf_new. Kausf is used as an input key to generate the Kseaf_new, and the key input parameter may include the key input parameter T1, the SN-name, and the like.

405. The AUSF sends a key update service response (Nausf_KeyUpdate_MEANS Response) to the target AMF.

If the key update succeeds, the key update service response (namely, a response to the key update service request) carries a success indication (Success), the Kseaf_new, and the like. In addition, if the key update fails, the key update service response may carry a failure cause, and the like.

406. The target AMF receives the key update service response from the AUSF.

If the key update service response indicates that the key update succeeds, the target AMF generates the Kamf_new (specifically, the Kamf_new is generated by the SEAF built in the target AMF).

An input key used by the target AMF to generate the Kamf_new is the Kseaf_new. The key input parameter of the Kamf_new includes an SUPI, ABBA (Anti-bidding down between architectures, anti-bidding down between architectures), and the like. The key input parameter of Kamf_new may further include the key input parameter T1.

For example, Kamf_new=KDF (Kseaf_new, SUPI, ABBA, [T1]).

In the embodiments of this application, parameter representations in [ ] are optional parameters.

407. The target AMF sends, to the UE, a message M4 used to activate a new key.

If the registration request message does not carry the New_Kseaf_Kamf_Indicator, the target AMF may add the New_Kseaf_Kamf_Indicator to the message M4. The New_Kseaf_Kamf_Indicator may be used to indicate the UE to generate the Kseaf_new and the Kamf_new. If the registration request message carries the New_Kseaf_Kamf_Indicator, the target AMF may not add the New_Kseaf_Kamf_Indicator to the M4 message.

The message M4 may further carry the key input parameter T1 and the like.

For example, integrity protection may be performed for the message M4 by using NAS keys generated by the Kamf_new.

For example, the message M4 may be a NAS Security Mode Command message.

408. The UE receives the message M4 from the target AMF.

If the message M4 carries the New_Kseaf_Kamf_Indicator, the UE generates the Kseaf_new and the Kamf_new by using a same mechanism as that on the network side.

In addition, the UE may also determine whether the Kseaf_new and the Kamf_new need to be generated. If the Kseaf_new and the Kamf_new need to be generated, the UE generates the Kseaf_new and the Kamf_new by using the same mechanism as that on the network side. In this case, at any time after sending the registration request message and before sending a message M5, the UE may perform operations of determining whether the Kseaf_new and the Kamf_new need to be generated and generating the Kseaf_new and the Kamf_new.

In addition, if integrity protection is performed for the message M4 by using the NAS keys generated by the Kamf_new, after generating the Kamf_new, the UE may authenticate integrity of the message M4 based on the NAS keys generated by the Kamf_new. If the integrity authentication fails, the UE may, for example, terminate the related procedure.

The UE sends the message M5 to the target AMF, to indicate the target AMF to complete key activation. The message M5 is, for example, a non-access stratum security mode complete (NAS Security Mode Complete) message.

409. Perform a network slice authentication procedure of the target slice.

410. After the network slice authentication of the target slice succeeds, the target AMF sends, to the UE, a registration accept message used to notify the UE of successful registration of the target slice.

In this embodiment, the key input parameter T1 may include a key update Counter maintained between the UE and the AUSF. Manners for generating the key update Counter, setting an initial value of the key update Counter, and updating and synchronizing the key update Counter after use are not specifically limited in this application.

Steps 401 to 409 in this embodiment occur between slice conversion initiation and conversion termination.

It can be learned that in the solution in this embodiment, the UE may provide some parameters for generating the Kseaf_new and the Kamf_new, so that key isolation between the source AMF and the target AMF can be implemented in a scenario of switching mutually exclusive slices, thereby implementing forward security of Kamf. In addition, in the solution in this embodiment, key isolation between the source AMF and the target AMF can be implemented in a slice switching scenario without updating an entire key system through main authentication. Compared with some possible solutions in which forward security of Kamf is implemented by updating the entire key system through main authentication, related efficiency of the solution in this embodiment of this application is significantly improved.

Figure 5:
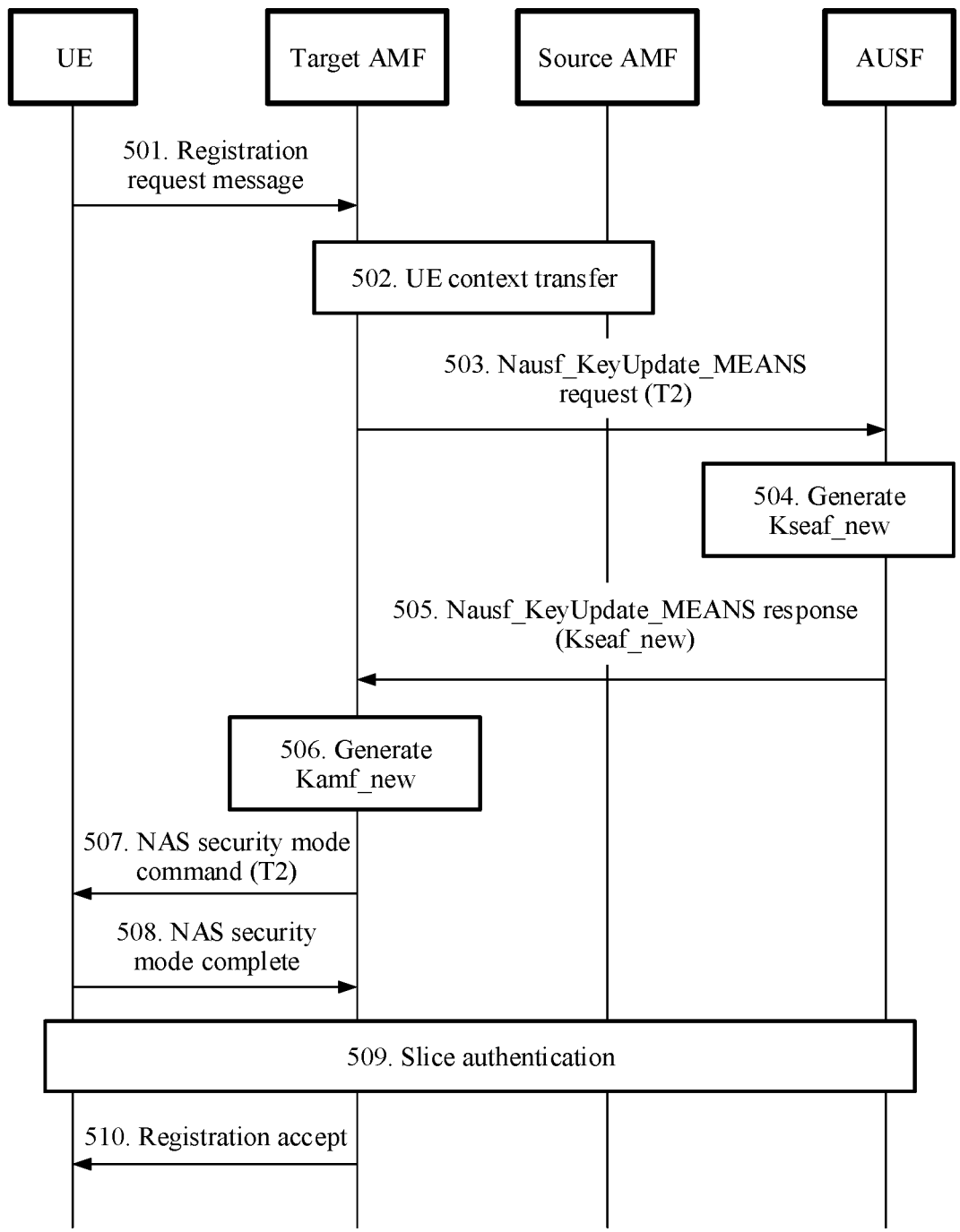
FIG. 5 is a schematic flowchart of another communication method according to an embodiment of this application.

FIG. 5 is a schematic flowchart of another communication method according to an embodiment of this application.

An example in which an SEAF and an AMF are integrally deployed (in this case, the SEAF and the AMF may be collectively referred to as an AMF) is used. When UE switches from a source slice to a target slice mutually exclusive with source slice, an AUSF generates Kseaf_new, and sends the generated Kseaf_new to a target AMF (built-in SEAF). The target AMF generates Kamf_new based on the Kseaf_new. Some parameters required for generating the Kseaf_new and the Kamf_new are provided by the target AMF.

As shown in FIG. 5, a communication method may include the following steps.

501. The UE sends a registration request message.

The registration request message carries NSSAI(s) of the target slice that the UE requests to access.

Optionally, the registration request message may further carry a New_Kseaf_Kamf_Indicator. The UE uses the New_Kseaf_Kamf_Indicator to notify the target AMF that a network side needs to generate the Kseaf_new and the Kamf_new. Certainly, the UE may also notify, in another manner that the network side needs to generate the Kseaf_new and the Kamf_new.

502. After receiving the registration request, the target AMF initiates a UE context transfer (UE) procedure. The target AMF may obtain a key Kamf_old of a source AMF, a subscriber permanent identifier (SUPI) of the UE, a network slice instance and the like from the source AMF by using the UE context transfer procedure.

503. The target AMF sends a key update service request Nausf_KeyUpdate_MEANS Request to the AUSF.

If the registration request message carries the New_Kseaf_Kamf_Indicator (namely, a Kseaf_Kamf update indication), the target AMF may send the key update service request to the AUSF under the indication of the New_Kseaf_Kamf_Indicator carried in the registration request message, to request to invoke a key update service of the AUSF.

In addition, if the registration request message does not carry the New_Kseaf_Kamf_Indicator, the target AMF may send the key update service request to the AUSF when determining that a preset key update condition is met, to request to invoke the key update service of the AUSF.

The key update service request sent to the AUSF carries a key input parameter T2. The key input parameter T2 may be one or more of the following parameters: a random number generated by the target AMF, a Counter that is maintained between the target AMF and the AUSF and that is used for key update (which may be referred to as a key update Counter for short), and description information of a slice group (or slice class) to which the target slice belongs, an identifier of the slice group (or slice class) to which the target slice belongs, description information of a target slice instance of S-NSSAI of a NAS UL Counter target slice, an identifier of the target slice instance, an identifier of the target AMF, description information of an instance of the target AMF, and an instance identifier of the target AMF, description information of an AMF Set to which the target AMF belongs, an identifier of the AMF Set to which the target AMF belongs, and the like. The key input parameter T2 is used to isolate the finally generated Kamf_new from the Kamf_old. In this embodiment of this application, a specific type of the key input parameter T2 is not limited, provided that the target input parameter can be met.

The key update service request sent to the AUSF may carry the key input parameter T2 from the registration request message.

The key update service request sent to the AUSF may further carry a subscriber persistent identity (SUPI) of the UE, a service network name (SN-name), and the like.

504. The AUSF receives the key update service request Nausf_KeyUpdate_MEANS Request from the target AMF.

If the key input parameter T2 carried in the key update service request from the target AMF includes a Counter that is synchronously maintained between the target AMF and the AUSF and that is used for key update, the AUSF may further detect whether the Counter included in the key input parameter T2 is acceptable. If the Counter is unacceptable, the AUSF may return an error cause to the target AMF and may terminate the subsequent key update procedure.

The AUSF generates the Kseaf_new. Kausf is used as an input key to generate the Kseaf_new, and the key input parameter may include the key input parameter T2, the SN-name, and the like.

505. The AUSF sends a key update service response Nausf_KeyUpdate_MEANS Response to the target AMF.

If the key update succeeds, the key update service response (namely, a response to the key update service request) carries a success indication (Success), the Kseaf_new, and the like. In addition, if the key update fails, the key update service response may carry a failure cause, and the like.

506. The target AMF receives the key update service response from the AUSF.

If the key update service response indicates that the key update succeeds, the target AMF generates the Kamf_new (specifically, the Kamf_new is generated by the SEAF built in the target AMF).

An input key used by the target AMF to generate the Kamf_new is the Kseaf_new. The key input parameter of the Kamf_new includes an SUPI, ABBA, and the like. The key input parameter of the Kamf_new may further include the key input parameter T2.

For example, Kamf_new=KDF (Kseaf_new, SUPI, ABBA, [T2]).

In the embodiments of this application, parameter representations in [ ] are optional parameters.

507. The target AMF sends, to the UE, a message M4 used to activate a new key.

If the registration request message does not carry the New_Kseaf_Kamf_Indicator, the target AMF may add the New_Kseaf_Kamf_Indicator to the message M4. The New_Kseaf_Kamf_Indicator may be used to indicate the UE to generate the Kseaf_new and the Kamf_new. If the registration request message carries the New_Kseaf_Kamf_Indicator, the target AMF may not add the New_Kseaf_Kamf_Indicator to the M4 message.

If the UE does not know some parameters in the key input parameter T2, such as a random number generated by the target AMF and a key update Counter maintained between the target AMF and the AUSF, the target AMF adds these parameters to the message M4, or the target AMF may add all parameters included in the key input parameter T2 to the message M4.

For example, integrity protection may be performed for the message M4 by using NAS keys generated by the Kamf_new.

For example, the message M4 may be a NAS Security Mode Command message.

508. The UE receives the message M4 from the target AMF.

If the M4 message carries the New_Kseaf_Kamf_Indicator, the UE generates the Kseaf_new and the Kamf_new by using a same mechanism as that on the network side.

In addition, the UE may also determine whether the Kseaf_new and the Kamf_new need to be generated. If the Kseaf_new and the Kamf_new need to be generated, the UE generates the Kseaf_new and the Kamf_new by using the same mechanism as that on the network side. In this case, at any time after sending the registration request message and before sending a message M5, the UE may perform operations of determining whether the Kseaf_new and the Kamf_new need to be generated and generating the Kseaf_new and the Kamf_new.

In addition, if integrity protection is performed for the message M4 by using the NAS keys generated by the Kamf_new, after generating the Kamf_new, the UE may authenticate integrity of the message M4 based on the NAS keys generated by the Kamf_new If the integrity authentication fails, the UE may, for example, terminate the related procedure.

The UE further sends the message M5 to the target AMF, to indicate the target AMF to complete key activation. The message M5 is, for example, a non-access stratum security mode complete (NAS Security Mode Complete) message.

509. Perform a network slice authentication procedure of the target slice.

510. After the network slice authentication of the target slice succeeds, the target AMF sends, to the UE, a registration accept message used to notify the UE of successful registration of the target slice.

In this embodiment, the key input parameter T2 may include a key update Counter maintained between the target AMF and the AUSF. Manners for generating the key update Counter, setting an initial value of the key update Counter, and updating and synchronizing the key update Counter after use are not specifically limited in this application.

Steps 501 to 509 in this embodiment occur between slice conversion initiation and conversion termination.

It can be learned that in the solution in this embodiment, the target AMF may provide some parameters for generating the Kseaf_new and the Kamf_new, so that key isolation between the source AMF and the target AMF can be implemented in a scenario of switching mutually exclusive slices, thereby implementing forward security of Kamf. In addition, in the solution in this embodiment, key isolation between the source AMF and the target AMF can be implemented in a slice switching scenario without updating an entire key system through main authentication. Compared with some possible solutions in which forward security of Kamf is implemented by updating the entire key system through main authentication, related efficiency of the solution in this embodiment of this application is significantly improved.

Figure 6:
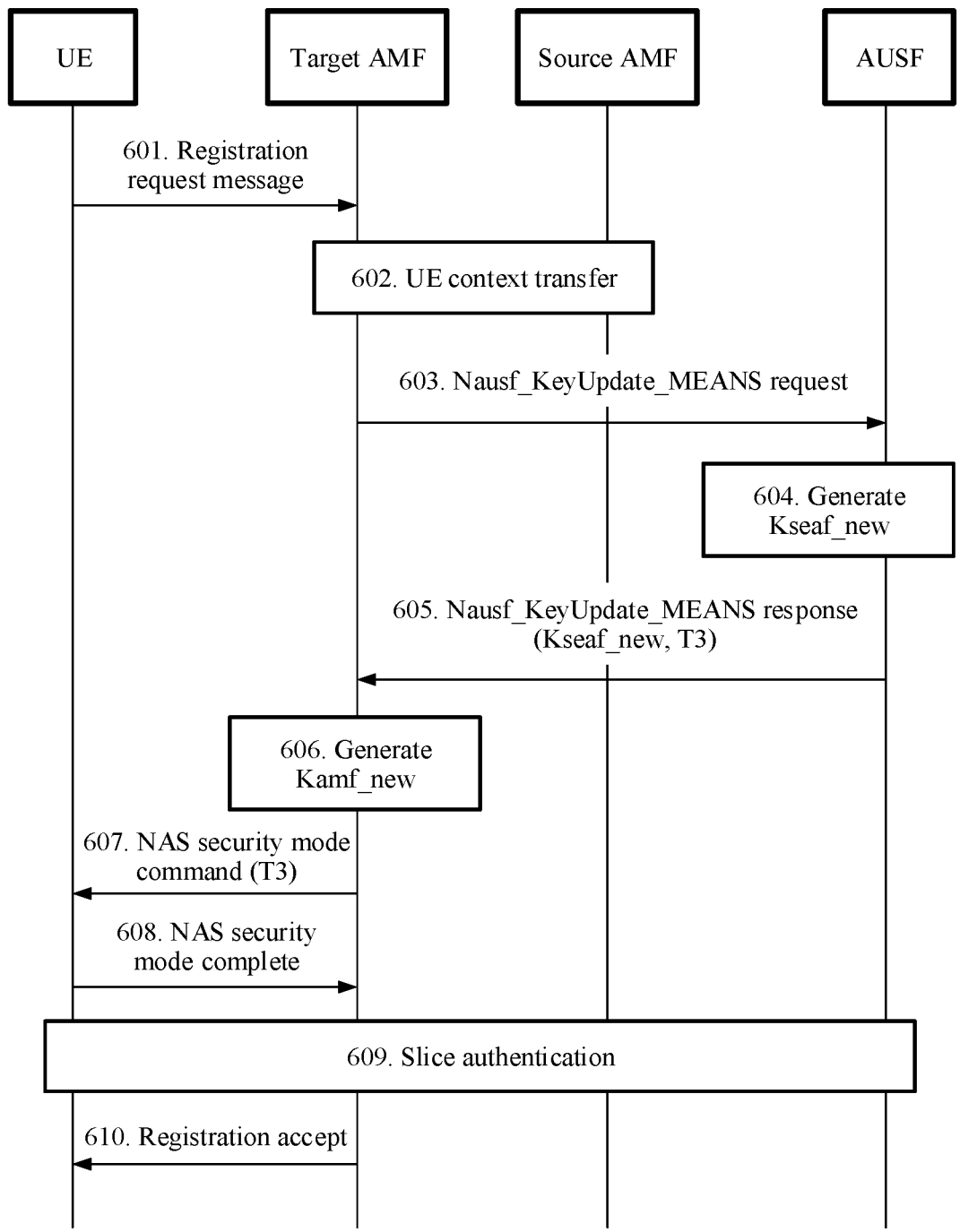
FIG. 6 is a schematic flowchart of another communication method according to an embodiment of this application.

FIG. 6 is a schematic flowchart of another communication method according to an embodiment of this application.

In this embodiment, an example in which an SEAF and an AMF are integrally deployed (in this case, the SEAF and the AMF may be collectively referred to as an AMF) is used. When UE switches from a source slice to a target slice mutually exclusive with source slice, an AUSF generates Kseaf_new, and sends the generated Kseaf_new to a target AMF (built-in SEAF). The target AMF generates Kamf_new based on the Kseaf_new. Some parameters required for generating the Kseaf_new and the Kamf_new are provided by the target AMF.

As shown in FIG. 6, another communication method may include the following steps.

601. The UE sends a registration request message.

The registration request message carries NSSAI(s) of the target slice that the UE requests to access.

Optionally, the registration request message may further carry a New_Kseaf_Kamf_Indicator. The UE uses the New_Kseaf_Kamf_Indicator to notify the target AMF that a network side needs to generate the Kseaf_new and the Kamf_new. Certainly, the UE may also notify, in another manner that the network side needs to generate the Kseaf_new and the Kamf_new.

602. After receiving the registration request, the target AMF initiates a UE context transfer (UE) procedure. The target AMF may obtain a key Kamf_old of a source AMF, a subscriber permanent identifier (SUPI) of the UE, a network slice instance and the like from the source AMF by using the UE context transfer procedure.

603. The target AMF sends a key update service request Nausf_KeyUpdate_MEANS Request to the AUSF.

If the registration request message carries the New_Kseaf_Kamf_Indicator (namely, a Kseaf_Kamf update indication), the target AMF may send the key update service request to the AUSF under the indication of the New_Kseaf_Kamf_Indicator carried in the registration request message, to request to invoke a key update service of the AUSF.

In addition, if the registration request message does not carry the New_Kseaf_Kamf_Indicator, the target AMF may send the key update service request to the AUSF when determining that a preset key update condition is met, to request to invoke the key update service of the AUSF.

The key update service request may further carry a subscriber permanent identifier (SUPI) of the UE, a service network name (SN-name), and the like.

604. The AUSF receives the key update service request Nausf_KeyUpdate_MEANS Request from the target AMF.

The AUSF generates the Kseaf_new. Kausf is used as an input key to generate the Kseaf_new, and the key input parameter includes a key input parameter T3 and the SN-name.

The key input parameter T3 may be one or more of the following input parameters: a key update Counter maintained between the target AMF and the AUSF, a random number generated by the AUSF, and the like. The key input parameter T3 is used to isolate the finally generated Kamf_new from the Kamf_old. In this embodiment of this application, a specific type of the key input parameter T3 is not limited, provided that the target input parameter can be met.

605. The AUSF sends a key update service response Nausf_KeyUpdate_MEANS Response to the target AMF.

If the key update succeeds, the key update service response (namely, a response to the key update service request) carries a success indication (Success), the Kseaf_new, the key input parameter T3, and the like. In addition, if the key update fails, the key update service response may carry a failure cause, and the like.

606. The target AMF receives the key update service response from the AUSF.

If the key update service response indicates that the key update succeeds, the target AMF generates the Kamf_new (specifically, the Kamf_new is generated by the SEAF built in the target AMF).

An input key used by the target AMF to generate the Kamf_new is the Kseaf_new. The key input parameter of the Kamf_new includes an SUPI, ABBA, and the like. The key input parameter of the Kamf_new may further include the key input parameter T3.

For example, Kamf_new=KDF (Kseaf_new, SUPI, ABBA, [T3]).

In the embodiments of this application, parameter representations in [ ] are optional parameters.

607. The target AMF sends, to the UE, a message M4 used to activate a new key.

If the registration request message does not carry the New_Kseaf_Kamf_Indicator, the target AMF may add the New_Kseaf_Kamf_Indicator to the message M4. The New_Kseaf_Kamf_Indicator may be used to indicate the UE to generate the Kseaf_new and the Kamf_new. If the registration request message carries the New_Kseaf_Kamf_Indicator, the target AMF may not add New_Kseaf_Kamf_Indicator to the M4 message.

The message M4 may carry the key input parameter T3.

For example, integrity protection may be performed for the message M4 by using NAS keys generated by the Kamf_new.

For example, the message M4 may be a NAS Security Mode Command (NAS SMC) message.

608. The UE receives the message M4 from the target AMF.

If the M4 message carries the New_Kseaf_Kamf_Indicator, the UE generates the Kseaf_new and the Kamf_new by using a same mechanism as that on the network side.

In addition, the UE may also determine whether the Kseaf_new and the Kamf_new need to be generated. If the Kseaf_new and the Kamf_new need to be generated, the UE generates the Kseaf_new and the Kamf_new by using the same mechanism as that on the network side. In this case, at any time after sending the registration request message and before sending a message M5, the UE may perform operations of determining whether the Kseaf_new and the Kamf_new need to be generated and generating the Kseaf_new and the Kamf_new.

In addition, if integrity protection is performed for the message M4 by using the NAS keys generated by the Kamf_new, after generating the Kamf_new, the UE may authenticate integrity of the message M4 based on the NAS keys generated by the Kamf_new. If the integrity authentication fails, the UE may, for example, terminate the related procedure.

The UE further sends the message M5 to the target AMF, to indicate the target AMF to complete key activation. The message M5 is, for example, a non-access stratum security mode complete (NAS Security Mode Complete) message.

609. Perform a network slice authentication procedure of the target slice.

610. After the network slice authentication of the target slice succeeds, the target AMF sends, to the UE, a registration accept message used to notify the UE of successful registration of the target slice.

In this embodiment, the key input parameter T3 may include a key update Counter maintained between the target AMF and the AUSF. Manners for generating the key update Counter, setting an initial value of the key update Counter, and updating and synchronizing the key update Counter after use are not specifically limited in this application.

Steps 601 to 609 in this embodiment occur between slice conversion initiation and conversion termination.

It can be learned that in the solution in this embodiment, the AUSF may provide some parameters for generating the Kseaf_new and the Kamf_new, so that key isolation between the source AMF and the target AMF can be implemented in a scenario of switching mutually exclusive slices, thereby implementing forward security of Kamf. In addition, in the solution in this embodiment, key isolation between the source AMF and the target AMF can be implemented in a slice switching scenario without updating an entire key system through main authentication. Compared with some possible solutions in which forward security of Kamf is implemented by updating the entire key system through main authentication, related efficiency of the solution in this embodiment of this application is significantly improved.

In addition, in the embodiments shown in FIG. 4 to FIG. 6, the Kseaf_new is mainly generated by the AUSF and sent to the target AMF. The target AMF then generates the Kamf_new based on the Kseaf_new. In these embodiments, an example in which the key input parameter is separately provided by the UE, the target AMF, or the AUSF is used for description.

However, in some other possible implementations, the Kseaf_new may still be generated by the AUSF and sent to the SEAF, and the target AMF then generates the Kamf_new based on the Kseaf_new. In addition, the key input parameter for generating the Kseaf_new may be jointly provided by one or more of the UE, the AUSF, and the target AMF. For example, the key input parameter T1 provided by the UE and the key input parameter T3 provided by the AUSF are used jointly as the key input parameter. For another example, the key input parameter T2 provided by the target AMF and the key input parameter T3 provided by the AUSF are used jointly as the key input parameter. For another example, the key input parameter T1 provided by the UE, the key input parameter T2 provided by the target AMF, and the key input parameter T3 provided by the AUSF are jointly used as the key input parameter. Other cases can be deduced by analogy.

Figure 7:
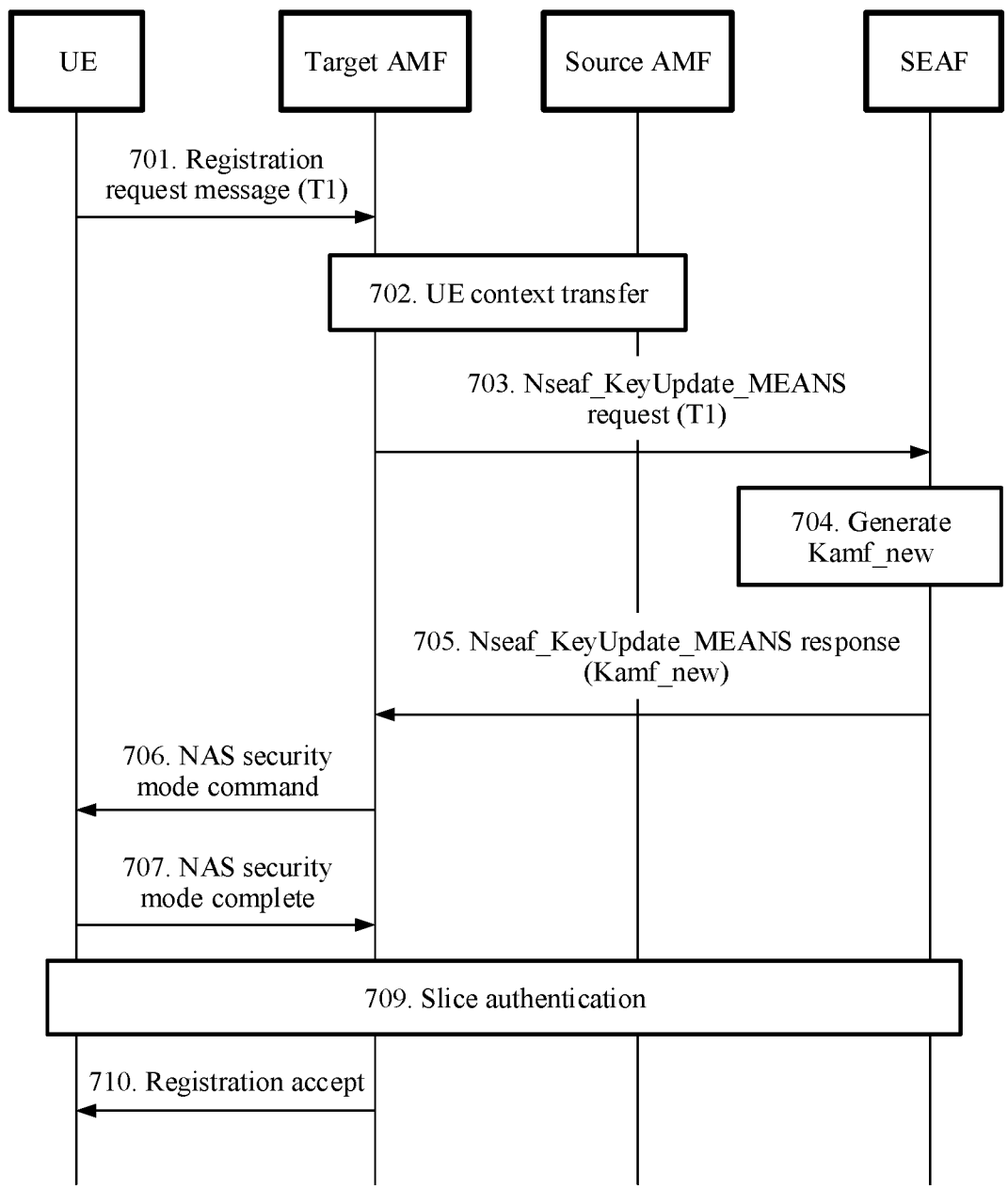
FIG. 7 is a schematic flowchart of another communication method according to an embodiment of this application.

FIG. 7 is a schematic flowchart of another communication method according to an embodiment of this application.

In this embodiment, a target AMF and an SEAF are separately deployed (namely, the SEAF is not deployed in the AMF), and the SEAF generates Kamf_new and sends the Kamf_new to the target AMF. A key input parameter to be used to generate the Kamf_new is provided by UE.

As shown in FIG. 7, a communication method may include the following steps.

701. The UE sends a registration request message.

The registration request message carries NSSAI(s) of a requested target slice, and the registration request message further carries a key input parameter T1 used to generate a new key.

The key input parameter T1 may include one or more of the following parameters: a random number generated by the UE, a Counter that is synchronously maintained between the UE and the SEAF and that is used for key update, S-NSSAI of the target slice, description information of a slice group (or slice class) to which the target slice belongs, an identifier of the slice group (or slice class) to which the target slice belongs, description information of a target slice instance, an identifier of the target slice instance, and the like.

The key input parameter T1 is used to isolate the finally generated Kamf_new from Kamf_old. A specific type of the key input parameter T1 is not limited in this embodiment of this application, provided that the target input parameter can be met.

Optionally, the registration request message may further carry integrity authentication information Auth_T1 of the key input parameter T1. The Auth_T1 may be used by the AUSF to authenticate whether a source of the key input parameter T1 is the UE, or may be used to authenticate whether the key input parameter T1 is tampered with or the like. An example of the Auth_T1 is as follows: Auth_T1=HMAC (Kausf, key input parameter T1). A specific form of the Auth_T1 is not limited herein, provided that the AUSF can authenticate, by using the Auth_T1, the source of the key input parameter T1 and whether the key input parameter T1 is tampered with.

Optionally, the registration request message may further carry a New_Kamf_Indicator 1. The UE uses the New_Kamf_Indicator 1 to notify the target AMF that a network side needs to generate the Kamf_new. Certainly, the UE may also notify, in another manner that the network side needs to generate the Kamf_new.

702. After receiving the registration request message, the target AMF may initiate a UE context transfer (UE) procedure. The target AMF may obtain, for example, a key Kamf of a source AMF, a subscriber permanent identifier (SUPI) of the UE, and a network slice instance from the source AMF by using the UE Context Transfer procedure.

703. The target AMF sends a key update service request Nseaf_KeyUpdate_MEANS Request to the SEAF.

If the registration request message carries the New_Kamf_Indicator 1, the target AMF may send the key update service request to the SEAF under the indication of the New_Kamf_Indicator 1 carried in the registration request message, to request to invoke a key update service of the SEAF.

In addition, if the registration request message does not carry the New_Kamf_Indicator 1, the target AMF may send the key update service request to the SEAF when determining that a preset key update condition is met, to request to invoke the key update service of the SEAF.

The key update service request may carry a key input parameter T1, an SUPI, and the like.

704. The SEAF receives the key update service request Nseaf_KeyUpdate_MEANS Request from the target AMF.

If the key input parameter T1 carried in the key update service request from the Target AMF includes a Counter that is maintained between the UE and the SEAF and that is used for key update, the SEAF detects whether the Counter is acceptable. If the Counter is unacceptable, the SEAF returns an error cause to the target AMF and terminates the subsequent key update procedure.

If the key update service request from the target AMF carries the Auth_T1, the SEAF authenticates the source of the key input parameter T1 and whether the key input parameter T1 is tampered with. If the input parameter T1 is tampered with, the SEAF returns an error cause to the target AMF and may terminate the subsequent key update procedure.

The SEAF generates the Kamf_new. Kseaf is used as an input key to generate the Kamf_new, and the key input parameter includes a key input parameter T2. Manners for generating the Kamf_new may be, for example, a manner A, a manner B, and a manner C.

Manner A: Kseaf is directly used as an input key to generate the Kamf_new, and the key input parameter T1 is directly used as a part of the key input parameter to generate the Kamf_new:

For example, Kamf_new=KDF (Kseaf, SUPI, ABBA, T1).

Manner B: Kseaf is directly used as an input key and the key input parameter T1 is indirectly used as the key input parameter to generate the Kamf_new. For example, ABBA and the key input parameter T1 are first used as parameters, and an algorithm is used to generate ABBA'. The algorithm for generating ABBA' is not limited herein. After ABBA' is generated, Kseaf is used as an input key and the SUPI and ABBA' are used as the key input parameter to generate the Kamf_new.

For example, ABBA'=F (ABBA, T1).
For example, Kamf_new=KDF (Kseaf, SUPI, ABBA').
Manner C: Kseaf is indirectly used as an input key to generate the Kamf_new. Specifically, for example, Kseaf is first used as an input key to generate Kseaf', and then Kseaf' is used as an input key to generate the Kamf_new.

For example, Kseaf'=KDF (Kseaf, T1).
For example, Kamf_new=KDF (Kseaf', SUPI, ABBA, [T1]).

In the embodiments of this application, parameter representations in [ ] are optional parameters.

Certainly, in the manners B and C, because Kseaf' is obtained based on Kseaf, Kseaf may still be considered as an input key of the Kamf_new, and T1 is considered as the key input parameter of the Kamf_new.

705. The SEAF sends a key update service response Nseaf_KeyUpdate_MEANS Response to the target AMF.

If the key update succeeds, the key update service response carries a success indication (Success), the Kamf_new, and the like. In addition, if the key update fails, the key update service response may carry a failure cause, and the like.

706. The target AMF receives the key update service response from the SEAF.

If the key update service response indicates that the key update fails, the target AMF may send, to the UE, for example, a notification indicating that slice access fails. The notification may be carried in, for example, a registration rejection message.

If the key update service response indicates that the key update succeeds, the target AMF sends a message M4 used to activate a new key.

707. The target AMF sends, to the UE, a message M4 used to activate a new key.

If the registration request message does not carry the New_Kamf_Indicator 1, the target AMF may add the New_Kamf_Indicator 1 to the message M4. The New_Kamf_Indicator 1 may be used to indicate the UE to generate the Kamf_new. If the registration request message carries the New_Kamf_Indicator 1, the target AMF may not add the New_Kamf_Indicator 1 to the M4 message.

The message M4 may also carry the key input parameter T1.

For example, integrity protection may be performed for the message M4 by using NAS keys generated by the Kamf_new.

For example, the message M4 may be a NAS Security Mode Command message.

708. The UE receives the message M4 from the target AMF.

If the message M4 carries the New_Kamf_Indicator 1, the UE generates the Kamf_new by using a same mechanism as that on the network side.

In addition, the UE may also determine whether the Kamf_new needs to be generated. If the Kamf_new needs to be generated, the UE generates the Kamf_new by using the same mechanism as that on the network side. In this case, at any time after sending the registration request message and before sending a message M5, the UE may perform operations of determining whether the Kamf_new needs to be generated and generating the Kamf_new.

In addition, if integrity protection is performed for the message M4 by using the NAS keys generated by the Kamf_new, after generating the Kamf_new, the UE may authenticate integrity of the message M4 based on the NAS keys generated by the Kamf_new. If the integrity authentication fails, the UE may, for example, terminate the procedure.

The UE further sends the message M5 to the target AMF, to indicate the target AMF to complete key activation.

The message M5 is, for example, a non-access stratum security mode complete (NAS Security Mode Complete) message.

709. Perform a network slice authentication procedure of the target slice.

710. After the network slice authentication of the target slice succeeds, the target AMF sends, to the UE, a registration accept message used to notify the UE of successful registration of the target slice.

In this embodiment, the key input parameter T1 may include a key update Counter maintained between the UE and the SEAF. Manners for generating the key update Counter, setting an initial value of the key update Counter, and updating and synchronizing the key update Counter after use are not specifically limited in this application.

Steps 701 to 709 in this embodiment occur between slice conversion initiation and conversion termination.

It can be learned that in the solution in this embodiment, the UE may provide some parameters for generating the Kseaf_new and the Kamf_new, so that key isolation between the source AMF and the target AMF can be implemented in a scenario of switching mutually exclusive slices, thereby implementing forward security of Kamf. In addition, in the solution in this embodiment, key isolation between the source AMF and the target AMF can be implemented in a slice switching scenario without updating an entire key system through main authentication. Compared with some possible solutions in which forward security of Kamf is implemented by updating the entire key system through main authentication, related efficiency of the solution in this embodiment of this application is significantly improved.

Figure 8:
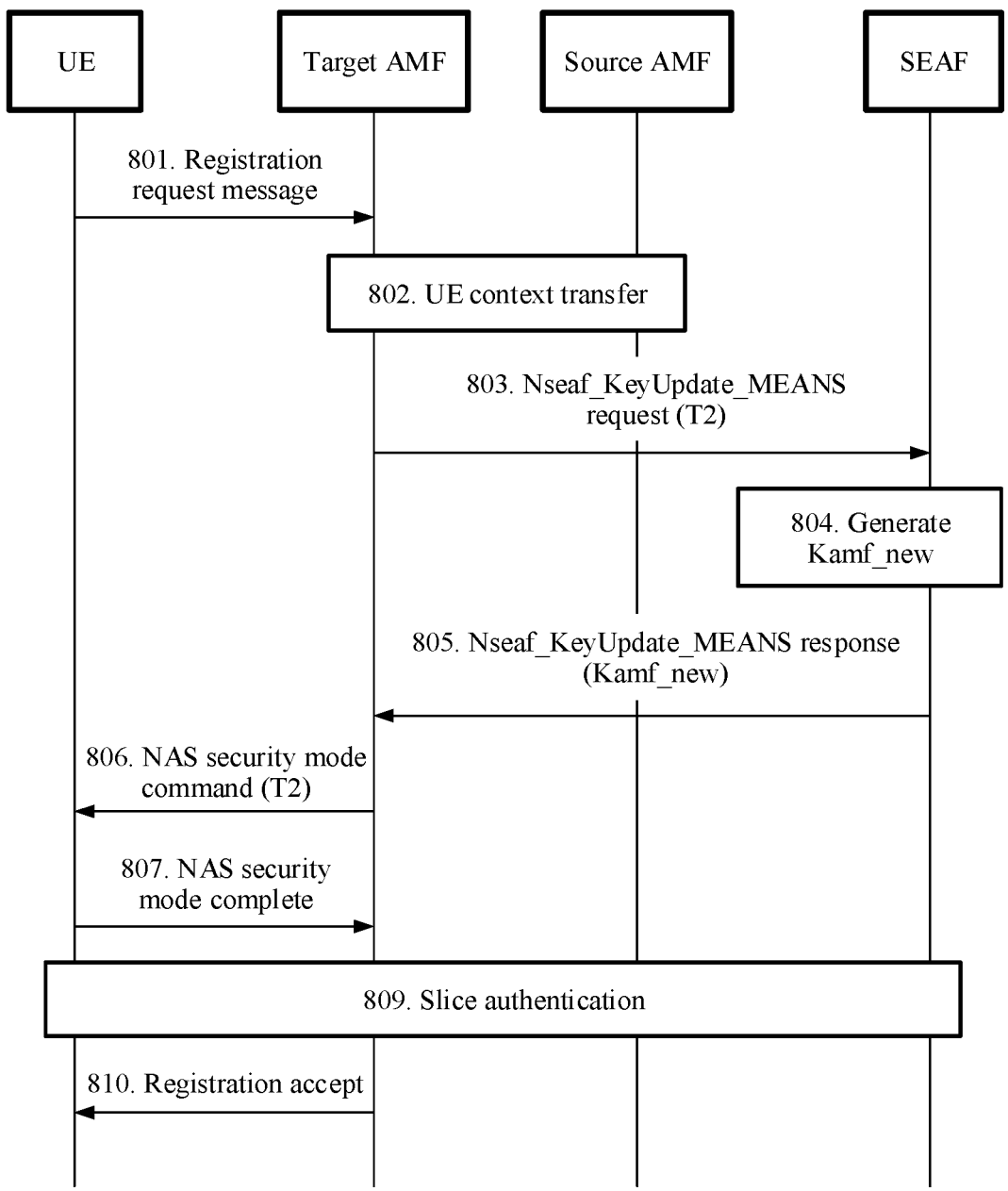
FIG. 8 is a schematic flowchart of another communication method according to an embodiment of this application.

FIG. 8 is a schematic flowchart of another communication method according to an embodiment of this application.

In this embodiment, an AMF and an SEAF are separately deployed (namely, the SEAF is not deployed in the AMF), and the SEAF generates Kamf_new and sends the Kamf_new to the AMF. A key input parameter that needs to be used to generate the Kamf_new is provided by the target AMF.

As shown in FIG. 8, a communication method may include the following steps.

801. UE sends a registration request Registration Request message.

The registration request message carries NSSAI(s) of a target slice that the UE requests to access.

Optionally, the registration request message may further carry a New_Kamf_Indicator 1. The UE uses the New_Kamf_Indicator 1 to notify the target AMF that a network side needs to generate the Kamf_new. Certainly, the UE may also notify, in another manner that the network side needs to generate the Kamf_new.

802. After receiving the registration request message, the target AMF may initiate a UE context transfer procedure. The target AMF may obtain, for example, a key Kamf of a source AMF, a subscriber persistent identifier (SUPI) of the UE, and a network slice an instance from the source AMF by using the UE Context Transfer procedure.

803. The target AMF sends a key update service request Nseaf_KeyUpdate_MEANS Request to the SEAF.

If the registration request message carries the New_Kamf_Indicator 1, the target AMF may send the key update service request to the SEAF under the indication of the New_Kamf_Indicator 1 carried in the registration request message, to request to invoke a key update service of the SEAF.

In addition, if the registration request message does not carry the New_Kamf_Indicator 1, the target AMF may send the key update service request to the SEAF when determining that a preset key update condition is met, to request to invoke the key update service of the SEAF.

The key update service request of the SEAF carries a key input parameter T2, an SUPI, and the like. The key input parameter T2 may be one or more of the following parameters: a random number generated by the target AMF, a Counter that is maintained between the target AMF and the SEAF and that is used for key update, a NAS UL Counter, S-NSSAI of the target slice, description information of a slice group (or slice class) to which the target slice belongs, an identifier of the slice group (or slice class) to which the target slice belongs, description information of a target slice instance, an identifier of the target slice instance, an identifier of the target AMF, description information of an instance of the target AMF, an instance identifier of the target AMF, description information of an AMF Set to which the target AMF belongs, an identifier of the AMF Set to which the target AMF belongs, and the like. The key input parameter T2 is used to isolate the generated Kamf_new from Kamf_old. In this embodiment of this application, a specific type of the key input parameter T2 is not limited, provided that the target input parameter can be met.

The key update service request carries the key input parameter T2 from the registration request message.

The key update service request of the SEAF may further carry a subscriber permanent identifier (SUPI) of the UE, a service network name (SN-name), and the like.

804. The SEAF receives the key update service request Nseaf_KeyUpdate_MEANS Request from the target AMF.

If the key input parameter T2 carried in the key update service request from the target AMF includes a Counter that is synchronously maintained between the target AMF and the SEAF and that is used for key update, the SEAF may further detect whether the Counter included in the key input parameter T2 is acceptable. If the Counter is unacceptable, the SEAF may return an error cause to the target AMF and may terminate the subsequent key update procedure.

The SEAF generates the Kamf_new. Kseaf is used as an input key to generate the Kamf_new, and the key input parameter includes the key input parameter T2.

Manners for generating the Kamf_new may be, for example, a manner A, a manner B, and a manner C.

Manner A: Kseaf is directly used as an input key to generate the Kamf_new.

For example, Kamf_new=KDF (Kseaf, SUPI, ABBA, T2).

Manner B: Kseaf is directly used as an input key and the key input parameter T1 is indirectly used as the key input parameter to generate the Kamf_new. For example, ABBA and the key input parameter T2 are first used as parameters, and an algorithm is used to generate ABBA'. The algorithm for generating ABBA' is not limited herein. After ABBA' is generated, Kseaf is used as an input key and the SUPI and ABBA' are used as the key input parameter to generate the Kamf_new.

For example, ABBA'=F (ABBA, T2).

For example, Kamf_new=KDF (Kseaf, SUPI, ABBA').

Manner C: Kseaf is indirectly used as an input key to generate the Kamf_new. Specifically, for example, Kseaf is first used as an input key to generate Kseaf', and then Kseaf' is used as an input key to generate the Kamf_new.

For example, Kseaf'=KDF (Kseaf, T2).

For example, Kamf_new=KDF (Kseaf', SUPI, ABBA, [T2]).

In the embodiments of this application, parameter representations in [ ] are optional parameters.

Certainly, in the manners B and C, because Kseaf' is obtained based on Kseaf, Kseaf may still be considered as an input key of the Kamf_new, and T2 is considered as the key input parameter of the Kamf_new.

805. The SEAF sends a key update service response Nseaf_KeyUpdate_MEANS Response to the target AMF.

If the key update succeeds, the key update service response carries a success indication (Success) and the Kamf_new. In addition, if the key update fails, the key update service response may carry a failure cause, and the like.

806. The target AMF receives the key update service response from the SEAF.

If the key update service response indicates that the key update fails, the target AMF may send, to the UE, for example, a notification indicating that slice access fails. The notification may be carried in, for example, a registration rejection message.

If the key update service response indicates that the key update succeeds, the target AMF sends a message M4 used to activate a new key.

807. The target AMF sends, to the UE, a message M4 used to activate a new key.

If the registration request message does not carry the New_Kamf_Indicator 1, the target AMF may add the New_Kamf_Indicator 1 to the message M4. The New_Kamf_Indicator 1 may be used to indicate the UE to generate the Kamf_new. If the registration request message carries the New_Kamf_Indicator 1, the target AMF may not add the New_Kamf_Indicator 1 to the M4 message.

If the UE does not know some parameters in the key generation parameter T2, for example, a random number generated by the target AMF and a key update Counter maintained between the target AMF and the SEAF, the target AMF sends the parameters in the message M4, or the target AMF may send all parameters included in the T2 in the message M4.

For example, integrity protection may be performed for the message M4 by using NAS keys generated by the Kamf_new.

For example, the message M4 may be a NAS Security Mode Command message.

808. The UE receives the message M4 from the target AMF.

If the message M4 carries the New_Kamf_Indicator 1, the UE generates the Kamf_new by using a same mechanism as that on the network side.

In addition, the UE may also determine whether the Kamf_new needs to be generated. If the Kamf_new needs to be generated, the UE generates the Kamf_new by using the same mechanism as that on the network side. In this case, at any time after sending the registration request message and before sending a message M5, the UE may perform operations of determining whether the Kamf_new needs to be generated and generating the Kamf_new.

In addition, if integrity protection is performed for the message M4 by using the NAS keys generated by the Kamf_new, after generating the Kamf_new, the UE may authenticate integrity of the message M4 based on the NAS keys generated by the Kamf_new. If the integrity authentication fails, the UE may, for example, terminate the related procedure.

The UE may further send the message M5 to the target AMF, to indicate the target AMF to complete key activation. The message M5 is, for example, a non-access stratum security mode complete (NAS Security Mode Complete) message.

809. Perform a network slice authentication procedure of the target slice.

810. After the network slice authentication of the target slice succeeds, the target AMF sends, to the UE, a registration accept message used to notify the UE of successful registration of the target slice.

In this embodiment, the key input parameter T2 may include a key update Counter maintained between the target AMF and the SEAF. Manners for generating the key update Counter, setting an initial value of the key update Counter, and updating and synchronizing the key update Counter after use are not specifically limited in this application.

Steps 801 to 809 in this embodiment occur between slice conversion initiation and conversion termination.

It can be learned that in the solution in this embodiment, the target AMF may provide some parameters for generating the Kseaf_new and the Kamf_new, so that key isolation between the source AMF and the target AMF can be implemented in a scenario of switching mutually exclusive slices, thereby implementing forward security of Kamf. In addition, in the solution in this embodiment, key isolation between the source AMF and the target AMF can be implemented in a slice switching scenario without updating an entire key system through main authentication. Compared with some possible solutions in which forward security of Kamf is implemented by updating the entire key system through main authentication, related efficiency of the solution in this embodiment of this application is significantly improved.

Figure 9:
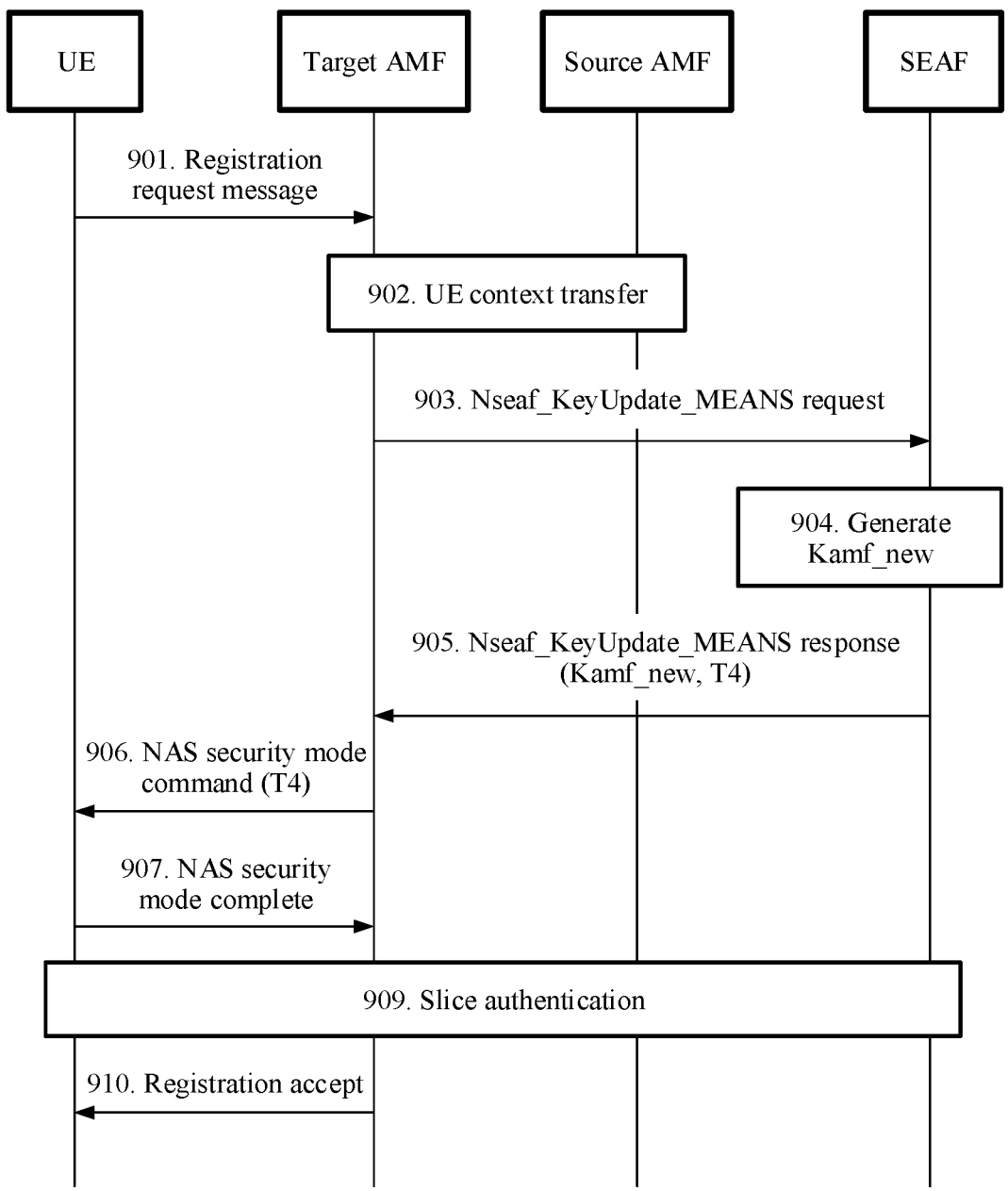
FIG. 9 is a schematic flowchart of another communication method according to an embodiment of this application.

FIG. 9 is a schematic flowchart of another communication method according to an embodiment of this application.

In this embodiment, a target AMF and an SEAF are separately deployed (namely, the SEAF is not deployed in the AMF), and the SEAF generates Kamf_new and sends the Kamf_new to the target AMF. A key input parameter to be used to generate the Kamf_new is provided by the SEAF.

As shown in FIG. 9, another communication method may include the following steps.

901. UE sends a registration request message.

The registration request message carries NSSAI(s) of a target slice requested by the UE.

Optionally, the registration request message may further carry a New_Kamf_Indicator 1. The UE uses the New_Kamf_Indicator 1 to notify the target AMF that a network side needs to generate the Kamf_new. Certainly, the UE may also notify, in another manner that the network side needs to generate the Kamf_new.

902. After receiving the registration request message, the target AMF may initiate a UE context transfer procedure. The target AMF may obtain, for example, a key Kamf of a source AMF, a subscriber permanent identifier (SUPI) of the UE, and a network slice instance from the source AMF by using the UE Context Transfer procedure.

903. The target AMF sends a key update service request Nseaf_KeyUpdate_MEANS Request to the SEAF.

If the registration request message carries the New_Kamf_Indicator 1, the target AMF may send the key update service request to the SEAF under the indication of the New_Kamf_Indicator 1 carried in the registration request message, to request to invoke a key update service of the SEAF.

In addition, if the registration request message does not carry the New_Kamf_Indicator 1, the target AMF may send the key update service request to the SEAF when determining that a preset key update condition is met, to request to invoke the key update service of the SEAF.

The key update service request carries an SUPI and the like.

904. The SEAF receives the key update service request Nseaf_KeyUpdate_MEANS Request from the target AMF.

The SEAF generates the Kamf_new. Kseaf is used as an input key to generate the Kamf_new, and the key input parameter includes a key input parameter T4. The key input parameter T4 may be one or more of the following several parameters: a random number generated by the SEAF, a Counter jointly maintained between the SEAF and the UE, and the like. The key input parameter T4 is used to isolate the finally generated Kamf_new from Kamf_old. In this embodiment of this application, a specific type of the key input parameter T4 is not limited, provided that the target input parameter can be met.

Manners for generating the Kamf_new may be, for example, a manner A, a manner B, and a manner C.

Manner A: Kseaf is directly used as an input key to generate the Kamf_new.

For example, Kamf_new=KDF (Kseaf, SUPI, ABBA, T4).

Manner B: Kseaf is directly used as an input key and a key input parameter T1 is indirectly used as the key input parameter to generate the Kamf_new. For example, ABBA and the key input parameter T4 are first used as parameters, and an algorithm is used to generate ABBA'. The algorithm for generating ABBA' is not limited herein. After ABBA' is generated, Kseaf is used as an input key and the SUPI and ABBA' are used as the key input parameter to generate the Kamf_new.

For example, ABBA'=F (ABBA, T4).

For example, Kamf_new=KDF (Kseaf, SUPI, ABBA').

Kseaf is indirectly used as an input key to generate the

Kamf_new. Specifically, for example, Kseaf is first used as an input key to generate Kseaf', and then Kseaf' is used as an input key to generate the Kamf_new.

For example, Kseaf'=KDF (Kseaf, T4).

For example, Kamf_new=KDF (Kseaf', SUPI, ABBA, [T4]).

In the embodiments of this application, parameter representations in [ ] are optional parameters.

Certainly, in the manners B and C, because Kseaf' is obtained based on Kseaf, Kseaf may still be considered as an input key of the Kamf_new, and T4 is considered as the key input parameter of the Kamf_new.

905. The SEAF sends a key update service response Nseaf_KeyUpdate_MEANS Response to the target AMF.

If the key update succeeds, the key update service response carries a success indication (Success), the Kamf_new, T4, and the like. In addition, if the key update fails, the key update service response may carry a failure cause, and the like.

906. The target AMF receives a key update service response from the SEAF.

If the key update service response indicates that the key update fails, the target AMF may send, to the UE, for example, a notification indicating that slice access fails. The notification may be carried in, for example, a registration rejection message.

If the key update service response indicates that the key update succeeds, the target AMF sends a message M4 used to activate a new key.

907. The target AMF sends, to the UE, a message M4 used to activate a new key.

If the registration request message does not carry the New_Kamf_Indicator 1, the target AMF may add the New_Kamf_Indicator 1 to the message M4. The New_Kamf_Indicator 1 may be used to indicate the UE to generate the Kamf_new. If the registration request message carries the New_Kamf_Indicator 1, the target AMF may not add the New_Kamf_Indicator 1 to the M4 message.

The message M4 carries the key input parameter T4.

For example, integrity protection may be performed for the message M4 by using NAS keys generated by the Kamf_new.

For example, the message M4 may be a NAS Security Mode Command message.

908. The UE receives the message M4 from the target AMF.

If the message M4 carries the New_Kamf_Indicator 1, the UE generates the Kamf_new by using a same mechanism as that on the network side.

In addition, the UE may also determine whether the Kamf_new needs to be generated. If the Kamf_new needs to be generated, the UE generates the Kamf_new by using the same mechanism as that on the network side. In this case, at any time after sending the registration request message and before sending a message M5, the UE may perform operations of determining whether the Kamf_new needs to be generated and generating the Kamf_new.

In addition, if integrity protection is performed for the message M4 by using the NAS keys generated by the Kamf_new, after generating the Kamf_new, the UE may authenticate integrity of the message M4 based on the NAS keys generated by the Kamf_new. If the integrity authentication fails, the UE may, for example, terminate the procedure.

The UE may further send the message M5 to the target AMF, to indicate the target AMF to complete key activation.

The message M5 is, for example, a non-access stratum security mode complete (NAS Security Mode Complete) message.

909. Perform a network slice authentication procedure of the target slice.

910. After the network slice authentication of the target slice succeeds, the target AMF sends, to the UE, a registration accept message used to notify the UE of successful registration of the target slice.

In this embodiment, the key input parameter T4 may include a key update Counter maintained synchronously between the target AMF and the SEAF. Manners for generating the key update Counter, setting an initial value of the key update Counter, and updating and synchronizing the key update Counter after use are not specifically limited in this application.

Steps 901 to 909 in this embodiment occur between slice conversion initiation and conversion termination.

It can be learned that in the solution in this embodiment, the SEAF may provide some parameters for generating the Kseaf_new and the Kamf_new, so that key isolation between the source AMF and the target AMF can be implemented in a scenario of switching mutually exclusive slices, thereby implementing forward security of Kamf. In addition, in the solution in this embodiment, key isolation between the source AMF and the target AMF can be implemented in a slice switching scenario without updating an entire key system through main authentication. Compared with some possible solutions in which forward security of Kamf is implemented by updating the entire key system through main authentication, related efficiency of the solution in this embodiment of this application is significantly improved.

In addition, in the embodiments shown in FIG. 7 to FIG. 9, the Kamf_new is mainly generated by using the SEAF and sent to the target AMF. In these embodiments, an example in which the key input parameter is separately provided by the UE, the target AMF, or the SEAF is used for description.

However, in some other possible implementations, the Kamf_new may still be generated by the SEAF and sent to the target AMF. In addition, the key input parameter for generating the Kamf_new may be jointly provided by one or more of the UE, the SEAF, and the target AMF. For example, the key input parameter T1 provided by the UE and the key input parameter T4 provided by the SEAF are jointly used as the key input parameter. For another example, the key input parameter T2 provided by the target AMF and the key input parameter T4 provided by the SEAF are jointly used as the key input parameter. For another example, the key input parameter T1 provided by the UE, the key input parameter T2 provided by the target AMF, and the key input parameter T4 provided by the SEAF are jointly used as the key input parameter. Other cases can be deduced by analogy.

Figure 10:
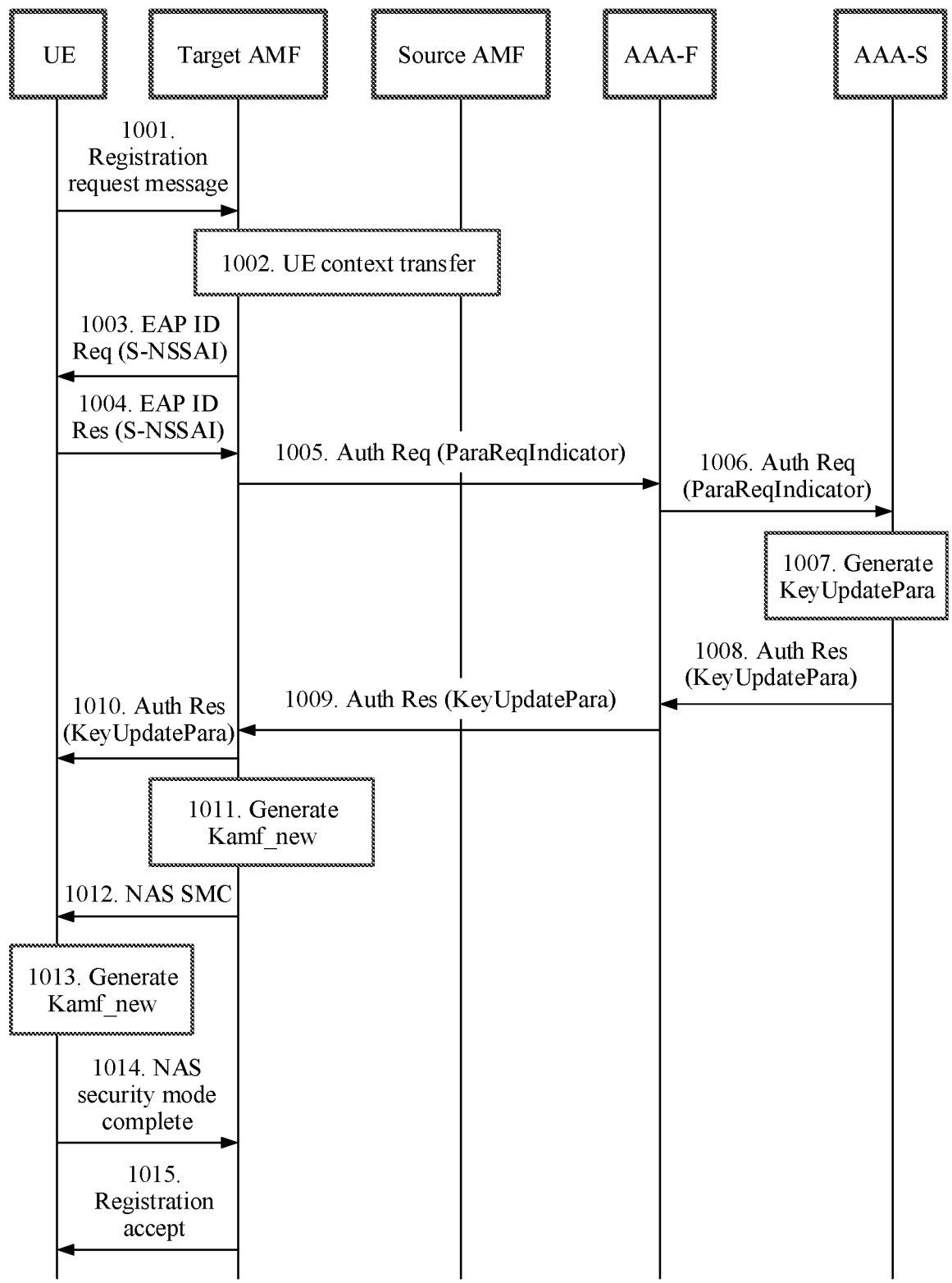
FIG. 10 is a schematic flowchart of another communication method according to an embodiment of this application.

FIG. 10 is a schematic flowchart of another communication method according to an embodiment of this application.

In this embodiment, an AMF and an SEAF are integrally deployed (namely, the SEAF is deployed in the AMF), and the target AMF generates Kamf_new. Some key input parameters for generating the Kamf_new are provided by an AAA-S.

As shown in FIG. 10, another communication method may include the following steps.

1001. UE sends a registration request message.

The registration request message carries NSSAI(s) of a requested target slice.

The registration request message may further carry a key update indication New_Kamf_Indicator 2. The key update indication New_Kamf_Indicator 2 is used to indicate the target AMF that a network side needs to generate the Kamf_new. Certainly, the UE may also notify, in another manner—that the network side needs to generate the Kamf_new.

1002. After receiving the registration request message, the target AMF may initiate a UE context transfer procedure. The target AMF may obtain, for example, a key Kamf of a source AMF, a subscriber permanent identifier (SUPI) of the UE, and a network slice instance from the source AMF by using the UE Context Transfer procedure.

1003. The target AMF determines to initiate a slice authentication procedure. The target AMF initiates an EAP ID obtaining procedure. The target AMF sends an EAP ID request to the UE.

1004. After receiving the EAP ID request, the UE sends, to the target AMF, an EAP ID response that carries a corresponding EAP ID.

1005. The target AMF sends an authentication request to an AAA-F.

If the registration request message carries the New_Kamf_Indicator 2, the target AMF may add a parameter request indication ParaReqIndicator to the authentication request message under the indication of the New_Kamf_Indicator 2 carried in the registration request message.

If the registration request message does not carry the New_Kamf_Indicator 2, the target AMF may add the parameter request indication ParaReqIndicator to the authentication request message when determining that a preset key update condition is met.

The parameter request indication ParaReqIndicator is used to indicate the AAA-S to generate a key input parameter T5. The key input parameter T5 is used to generate the Kamf_new.

1006. The AAA-F forwards the authentication request Authentication Request to the AAA-S.

1007. The AAA-S receives the authentication request Authentication Request forwarded by the AAA-F.

If the authentication request carries a parameter request indication ParaReqIndicator, the AAA-S generates the key input parameter T5 under the indication of the parameter request indication ParaReqIndicator.

If the authentication request does not carry the parameter request indication ParaReqIndicator, the AAA-S may generate the key input parameter T5 when determining that a preset key parameter generation condition is met.

The key input parameter T5 may be generated by using a shared secret between the UE and the AAA-S, for example, an Extended Master Session Key (EMSK) generated through slice authentication. An algorithm of generating the key input parameter T5 and a used input are not limited in this application, provided that the generated key input parameter T5 can meet: Only the UE and the AAA-S can generate the key input parameter T5.

1008. The AAA-S sends an authentication response to the AAA-F.

The authentication response carries the key input parameter T5.

1009. After receiving the Authentication Response from the AAA-S, the AAA-F forwards the Authentication Response to the target AMF.

1010. The target AMF receives the authentication response Authentication Response from the AAA-F.

1011. The target AMF generates the Kamf_new. An input key used to generate the Kamf_new is Kamf obtained by the target AMF from the source AMF, and the key input parameter used to generate the Kamf_new includes the key input parameter T5.

For example, Kamf_new=KDF (Kamf_old, T5).

1012. The target AMF sends, to the UE, a message M4 used to activate a new key.

If the registration request message does not carry the New_Kamf_Indicator 2, the target AMF may add the New_Kamf_Indicator 2 to the message M4. The New_Kamf_Indicator 2 may be used to indicate the UE to generate the Kamf_new. If the registration request message carries the New_Kamf_Indicator 1, the target AMF may not add the New_Kamf_Indicator 1 to the M4 message.

For example, integrity protection may be performed for the message M4 by using NAS keys generated by the Kamf_new.

For example, the message M4 may be a NAS Security Mode Command message.

1013. The UE receives the message M4 from the target AMF.

If the message M4 carries the New_Kamf_Indicator 2, the UE uses a same mechanism as that of the AAA-S to generate the key input parameter T5 and uses a same mechanism as that of the target AMF to generate the Kamf_new.

If the message M4 does not carry the New_Kamf_Indicator 2, the UE may also generate the key input parameter T5 by using the same mechanism as that of the AAA-S when determining that a preset key update condition is met, and generate the Kamf_new by using the same mechanism as that of the target AMF. In this case, at any time after sending the registration request message and before sending a M5 message, the UE may perform determining and generate the key input parameter T5 and the Kamf_new.

In addition, if integrity protection is performed for the message M4 by using the NAS keys generated by the Kamf_new, the UE may first authenticate integrity of the message M4, and after the integrity authentication succeeds, perform the steps of generating the Kseaf_new and the Kamf_new. If the integrity authentication fails, the UE may, for example, terminate the procedure.

1014. The UE sends the message M4 to the target AMF. The message M4 is, for example, a NAS Security Mode Complete message.

1015. After the network slice authentication of the target slice succeeds, the target AMF sends, to the UE, a registration accept message used to notify the UE of successful registration of the target slice.

In addition, in the embodiment shown in FIG. 10, the target AMF may further send the ParaReqIndicator to the AAA-S in any authentication request.

In addition, in the embodiment shown in FIG. 10, after generating the key input parameter T5, the AAA-S may send the key input parameter T5 to a network in any authentication response message of slice authentication.

It can be learned that, in the foregoing solution in this embodiment, key isolation between the source AMF and the target AMF can be implemented in a slice switching scenario, thereby implementing forward security of Kamf. In addition, in the solution in this embodiment, key isolation between the source AMF and the target AMF can be implemented in a slice switching scenario without updating an entire key system through main authentication. Compared with some possible solutions in which forward security of Kamf is implemented by updating the entire key system through main authentication, related efficiency of the solution in this embodiment of this application is significantly improved.

In addition, in the embodiment shown in FIG. 10, the Kamf_new is mainly generated by the target AMF. In this embodiment, an example in which the key input parameter is provided by the AAA-S is used for description. However, in some other possible implementations, the Kamf_new may still be generated by the target AMF.

In addition, the key input parameter for generating the Kamf_new may further:
- be provided by the AAA-S and the UE, namely, the key input parameter T1 provided by the UE and the key input parameter T5 provided by the AAA-S are jointly used as the key input parameter; or,
- be provided by the AAA-S and the target AMF, namely, the key input parameter T2 provided by the target AMF and the key input parameter T5 provided by the AAA-S are jointly used as the key input parameter; or,
- be provided by the AAA-S, the UE, and the target AMF, namely, the key input parameter T1 provided by the UE, the key input parameter T5 provided by the AAA-S, and the key input parameter T2 provided by the target AMF are jointly used as the key input parameter.

In the foregoing example solutions of the embodiments corresponding to FIG. 4 to FIG. 10, the UE initiates the registration request message to the network side based on the situation in which the UE switches from one source slice to a next target slice mutually exclusive with the source slice. Actually, that the UE switches from one source slice to a next target slice mutually exclusive with the source slice may also be triggered by the network side. For example, the source AMF serving the source slice obtains, based on the target slice, a target AMF that can serve the target slice, and indicates the target AMF to connect the UE to the target slice. In this scenario, forward security of Kamf can still be implemented by using a similar mechanism in the foregoing example solutions.

The network element that generates the new keys Kamf_new/Kseaf_new may be one of the following network elements: an AUSF, an SEAF, and a target AMF.

A main difference lies in that a network element that provides a key input parameter used to generate new keys (Kamf_new/Kseaf_new) may be one of the following network elements: a target AMF, an AUSF, an SEAF (in a scenario in which the SEAF and the AMF are deployed separately), an AAA-S, and the like.

The target AMF provides a key input parameter T2. The key input parameter T2 may be one or more of the following parameters: a random number generated by the target AMF, a Counter used for key update, a NAS UL Counter, S-NSSAI of the target slice, description information of a slice group (or slice class) to which the target slice belongs, an identifier of the slice group (or slice class) to which the target slice belongs, description information of a target slice instance, an identifier of the target slice instance, an identifier of the target AMF, an instance of the target AMF, an instance identifier of the target AMF, description information of an AMF Set to which the target AMF belongs, an identifier of the AMF Set to which the target AMF belongs, and the like. The key input parameter T2 is provided to isolate the finally generated Kamf_new from Kamf_old. In the embodiments of this application, a specific type of the key input parameter T2 is not limited, provided that the target input parameter can be met.

The key input parameter T3 is provided by the AUSF. The key input parameter T3 may be one or more of the following parameters: a random number generated by the AUSF, a Counter used for key update, or the like. The key input parameter T3 is used to isolate a finally generated Kamf_new from Kamf_old. In this embodiment of this application, a specific type of the key input parameter T3 is not limited, provided that the target input parameter can be met.

The key input parameter T4 is provided by the SEAF. The key input T4 may be one or more of the following parameters: a random number generated by the SEAF, a Counter used for key update, and the like. The key input parameter T4 is used to isolate the finally generated Kamf_new from the Kamf_old. In the embodiments of this application, a specific type of the key input parameter T4 is not limited, provided that the target input parameter can be met.

The slice authentication and authorization function AAA-S provides a key input parameter T5. The key input parameter T5 is generated, for example, by using a shared secret between the UE and the AAA-S, for example, an Extended Master Session Key established between the UE and the AAA-S. The present invention does not limit a method for generating the key input parameter T5, provided that only the UE and the AAA-S can generate the key input parameter T5.

The main difference further lies in that a condition for triggering the network side to generate the Kamf_new may be that the source AMF indicates the target AMF, or the target AMF determines whether the Kamf_new needs to be generated. A condition for triggering a UE side to generate the Kamf_new may be that the target AMF indicates the UE to generate the Kamf_new.

For a similar implementation of the scenario in which the UE switches from one source slice to a next target slice mutually exclusive with the source slice and that is triggered by the network side, refer to related descriptions in the foregoing embodiments. Details are not described herein again.

The following further provides some products in the solutions of the embodiments of this application.

Figure 11:
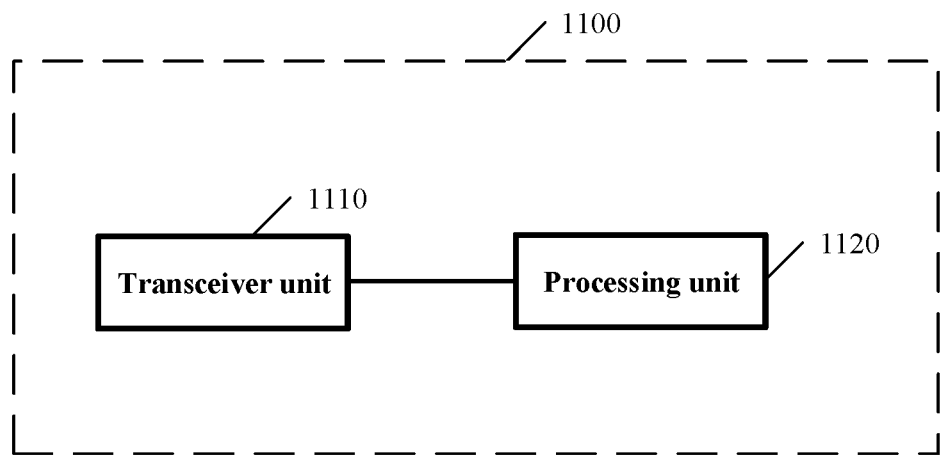
FIG. 11 is a schematic structural diagram of user equipment according to an embodiment of this application.

Refer to FIG. 11. User equipment UE 1100 is provided, and may include a transceiver unit 1110 and a processing unit 1120.

The transceiver unit 1110 is configured to send a registration request message when the UE switches from a source slice to a target slice mutually exclusive with the source slice, where the registration request message carries network slice selection assistance information NSSAI of the target slice requested by the UE.

The processing unit 1120 is configured to obtain a first AMF key Kamf_new, where the Kamf_new is different from a second AMF key Kamf_old, the Kamf_new is a key of a target AMF serving the target slice, and the Kamf_old is a key of a source AMF serving the source slice.

In some possible implementations, the transceiver unit 1110 is further configured to: before obtaining the first AMF key Kamf_new, receive a first message that carries a key input parameter and that is sent by the target AMF, where the key input parameter is used to generate the Kamf_new.

In some possible implementations, the transceiver unit 1110 is further configured to: before obtaining the first AMF key Kamf_new, receive a second message that carries a first key update indication and that is sent by the target AMF, where the first key update indication is used to indicate the UE to update an AMF key.

In some possible implementations, the registration request message carries a key input parameter T1, where the key input parameter T1 is used to generate the Kamf_new.

In some possible implementations, the registration request message carries a second key update indication, where the second key update indication is used to indicate a network side to update an AMF key.

The functional modules of the user equipment 1100 in this embodiment may cooperate to complete some or all steps of any one of the methods performed by the UE in the foregoing method embodiments.

Figure 12:
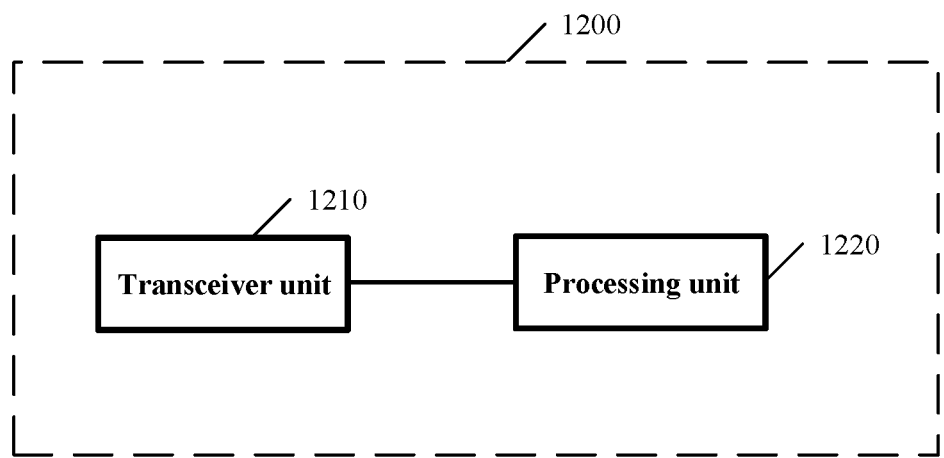
FIG. 12 is a schematic structural diagram of a target AMF according to an embodiment of this application.

Refer to FIG. 12. A target AMF is provided, and may include a transceiver unit 1210 and a processing unit 1220.

The transceiver unit 1210 is configured to: when UE switches from a source slice to a target slice mutually exclusive with the source slice, receive a registration request message from the UE, where the registration request message carries network slice selection assistance information NSSAI of the target slice requested by the UE.

The processing unit 1220 is configured to obtain a first AMF key Kamf_new, where the first AMF key Kamf_new is different from a second AMF key Kamf_old, the Kamf_new is a key of the target AMF, the target AMF is an AMF serving the target slice, and the Kamf_old is a key of a source AMF serving the source slice.

In some possible implementations, the registration request message further carries a second key update indication, where the second key update indication is used to indicate a network side to update an AMF key; or the target AMF obtains the Kamf_new when determining that a locally preset key update condition is met.

In some possible implementations, the registration request message carries a key input parameter T1, where the key input parameter T1 is used to generate the Kamf_new.

In some possible implementations, the transceiver unit 1210 is further configured to: after receiving the registration request message from the UE,
send a key update service request to an authentication server function AUSF, where the key update service request carries the key input parameter T1 and/or a key input parameter T2; and receive a response that is specific to the key update service request and that is returned by the AUSF, where the response carries an SEAF key Kseaf_new, the key input parameter T1 and/or the key input parameter T2 are/is used to generate the Kseaf_new, and the Kseaf_new is used to generate the Kamf_new.

Further, the transceiver unit may be further configured to send, to the UE, a first message that carries some or all key input parameters (for example, the key input parameter T2) used to generate the Kseaf_new.

In some possible implementations, the transceiver unit 1210 is further configured to: after receiving the registration request message from the UE, send a key update service request to an AUSF; receive a response that is specific to the key update service request and that is returned by the AUSF, where the response carries the Kseaf_new and a key input parameter T3, the key input parameter T3 is used to generate the Kseaf_new, and the Kseaf_new is used to generate the Kamf_new; and send, to the UE, a first message that carries the key input parameter T3.

In some possible implementations, the transceiver unit 1210 is further configured to: after receiving the registration request message from the UE, send a key update service request to an AUSF, where the key update service request carries a key input parameter T2 and/or the key input parameter T1; receive a response that is specific to the key update service request and that is returned by the AUSF, where the response carries the Kseaf_new and a key input parameter T3, the key input parameter T3 and the key input parameter that is carried in the key update service request are used to generate the Kseaf_new, and the Kseaf_new is used to generate the Kamf_new; and send, to the UE, a first message that carries the key input parameter T3.

In some possible implementations, the transceiver unit 1210 is further configured to: after receiving the registration request message from the UE, send a key update service request to a security anchor function SEAF, where the key update service request carries a key input parameter T2 and/or the key input parameter T1; and receive a response that is specific to the key update service request and that is returned by the SEAF, where the response carries the Kamf_new, and the key input parameter T2 and/or the key input parameter T1 are/is used to generate the Kamf_new. Further, the transceiver unit may be further configured to send, to the UE, a first message that carries some or all key input parameters (for example, the key input parameter T2) used to generate the Kamf_new.

In some possible implementations, the transceiver unit 1210 is further configured to: after receiving the registration request message from the UE, send a key update service request to an SEAF; receive a response that is specific to the key update service request and that is returned by the SEAF, where the response carries the Kamf_new and a key input parameter T4, and the key input parameter T4 is used to generate the Kamf_new; and send, to the UE, a first message that carries the key input parameter T4.

In some possible implementations, the transceiver unit 1210 is further configured to: after receiving the registration request message from the UE, send a key update service request to an SEAF, where the key update service request carries a key input parameter T2 and/or the key input parameter T1; receive a response that is specific to the key update service request and that is returned by the SEAF, where the response carries the Kamf_new and a key input parameter T4, and the key input parameter T4 and the key input parameter that is carried in the key update service request are used to generate the Kamf_new; and send, to the UE, a first message that carries the key input parameter T4.

In some possible implementations, the transceiver unit 1210 is further configured to: after receiving the registration request message from the UE and for requesting to access the target slice, send, to a slice authentication and authorization server (AAA-S), a message that carries a key parameter indication, where the key parameter indication is used to indicate the AAA-S to generate a key input parameter T5; and receive the key generation parameter T5 sent by the AAA-S, where the key input parameter T5 may be used to generate the Kamf_new; or
send, by the target AMF to an AAA-S, a message that carries a key parameter indication, where the key parameter indication is used to indicate the AAA-S to generate a key input parameter T5; and receive, by the target AMF, the key generation parameter T5 sent by the AAA-S, where the key input parameter T5 is used to generate the Kamf_new, and the key input parameter T1 and/or the key input parameter T2 are/is further used to generate the Kamf_new.

The functional modules of the target AMF 1200 in this embodiment may cooperate to complete some or all steps of any one of the methods performed by the target AMF in the foregoing method embodiments.

Figure 13:
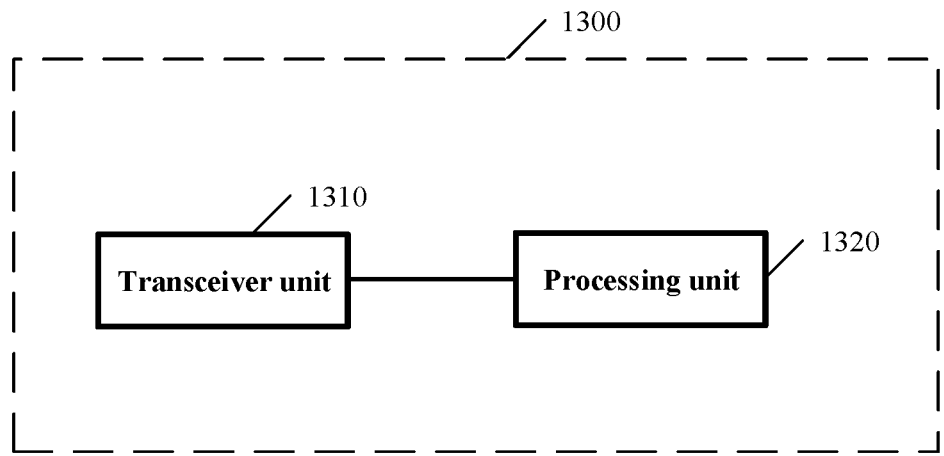
FIG. 13 is a schematic structural diagram of an AUSF according to an embodiment of this application.

Refer to FIG. 13. An authentication server function AUSF 1300 is provided, and includes:
a processing unit 1320, configured for the AUSF to: when UE switches from a source slice to a target slice mutually exclusive with the source slice, generate Kseaf_new after receiving a key update service request from a target AMF, where the Kseaf_new is used to generate Kamf_new, the Kamf_new is different from a second AMF key Kamf_old, the Kamf_new is a key of the target AMF serving the target slice, and the Kamf_old is a key of a source AMF serving the source slice; and a transceiver unit 1310, configured to return a response to the key update service request to the target AMF, where the response carries the Kseaf_new, and the Kseaf_new is used to generate the Kamf_new.

One or more of a key input parameter T1, a key input parameter T2, and a key input parameter T3 are used to generate the Kseaf_new.

When the key input parameter T1 and/or the key input parameter T2 are/is used to generate the Kseaf_new, the key input parameter T1 and/or the key input parameter T2 are/is carried in the key update service request of the AUSF.

When the key input parameter T3 is used to generate the Kseaf_new, the response to the key update service request carries the key input parameter T3.

The functional modules of the AUSF 1300 in this embodiment may cooperate to complete some or all steps of any one of the methods performed by the AUSF in the foregoing method embodiments.

Figure 14:
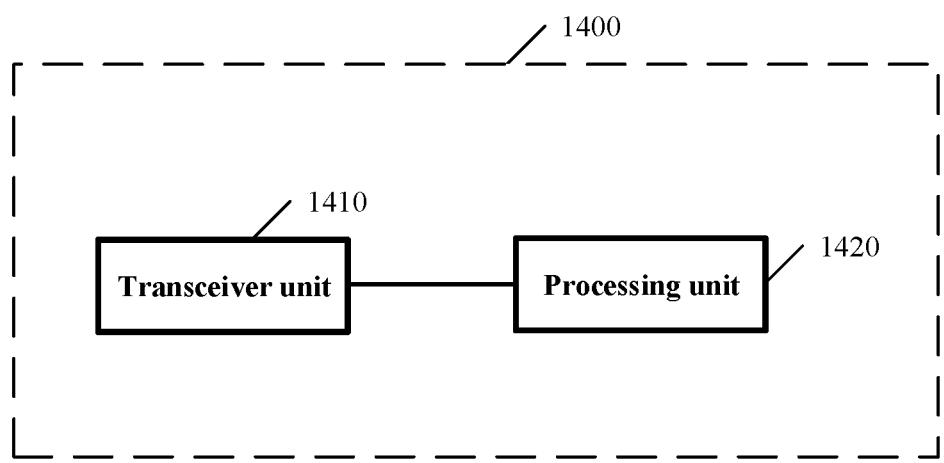
FIG. 14 is a schematic structural diagram of an SEAF according to an embodiment of this application.

Refer to FIG. 14. A security anchor function SEAF 1400 is provided, and may include:

a processing unit 1420, configured for the SEAF to: when UE switches from a source slice to a target slice mutually exclusive with the source slice, generate Kamf_new after receiving a key update service request from the target AMF, where the Kamf_new is different from a second AMF key Kamf_old, the Kamf_new is a key of a target AMF serving the target slice, and the Kamf_old is a key of a source AMF serving the source slice; and a transceiver unit 1410, configured to return a response to the key update service request to the target AMF, where the response carries the Kamf_new.

One or more of a key input parameter T1, a key input parameter T2, and a key input parameter T4 are used to generate the Kamf_new.

When the key input parameter T1 and/or the key input parameter T2 are/is used to generate the Kamf_new, the key input parameter T1 and/or the key input parameter T2 are/is carried in the key update service request of the SEAF.

When the key input parameter T4 is used to generate Kseaf_new, the response to the key update service request carries the key input parameter T4.

The functional modules of the SEAF 1400 in this embodiment may cooperate to complete some or all steps of any one of the methods performed by the SEAF in the foregoing method embodiments.

Figure 15:
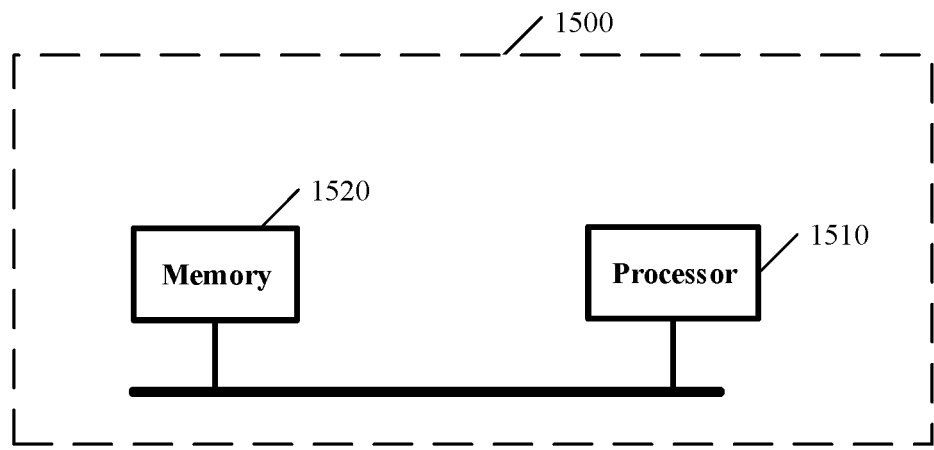
FIG. 15 is a schematic structural diagram of another user equipment according to an embodiment of this application.

Refer to FIG. 15. User equipment 1500 is provided, and includes a processor 1510 and a memory 1520 that are coupled to each other. The processor 1510 is configured to invoke a computer program stored in the memory, to perform some or all steps performed by the UE in any one of the methods provided in the embodiments of this application.

Figure 16:
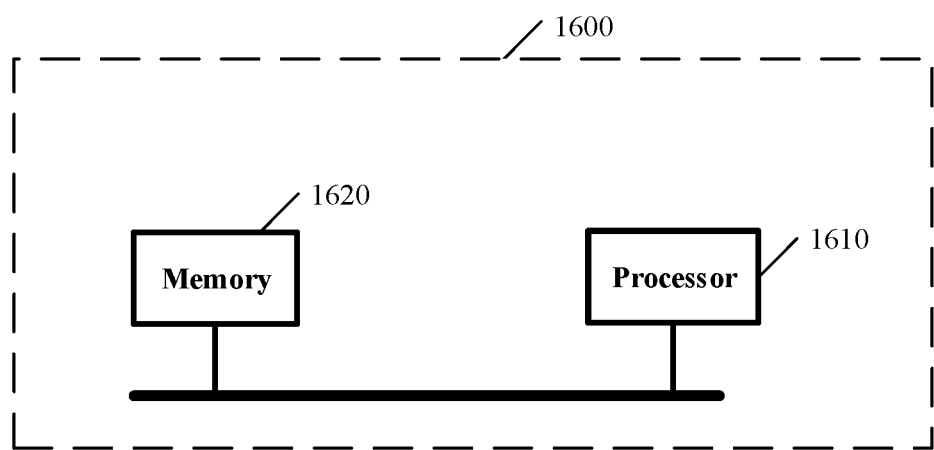
FIG. 16 is a schematic structural diagram of another target AMF according to an embodiment of this application.

Refer to FIG. 16. A target AMF 1600 is provided, and includes a processor 1610 and a memory 1620 that are coupled to each other. The processor 1610 is configured to invoke a computer program stored in the memory, to perform some or all steps performed by the target AMF in any one of the methods provided in the embodiments of this application.

Figure 17:
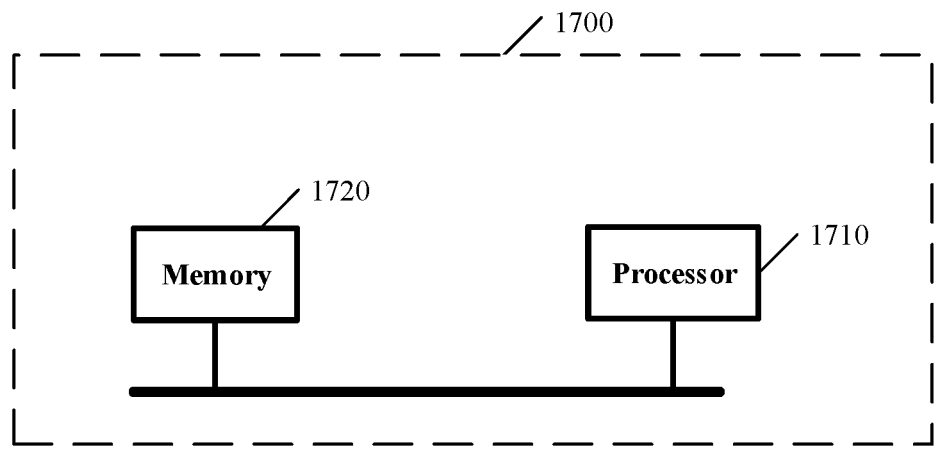
FIG. 17 is a schematic structural diagram of another AUSF according to an embodiment of this application.

Refer to FIG. 17. An AUSF 1700 is provided, and includes a processor 1710 and a memory 1720 that are coupled to each other. The processor 1710 is configured to invoke a computer program stored in the memory, to perform some or all steps performed by the AUSF in the method provided in the foregoing embodiment of this application.

Figure 18:
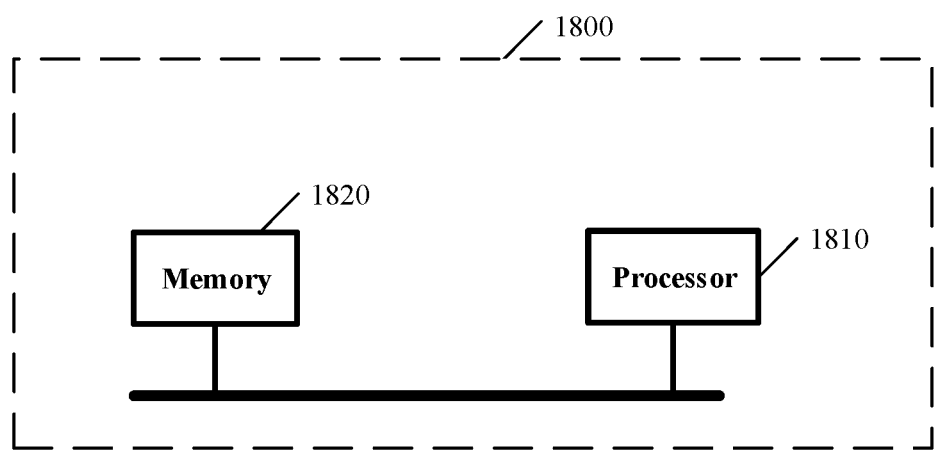
FIG. 18 is a schematic structural diagram of another SEAF according to an embodiment of this application.

Refer to FIG. 18. An SEAF 1800 is provided, and includes a processor 1810 and a memory 1820 that are coupled to each other. The processor 1810 is configured to invoke a computer program stored in the memory, to perform some or all steps performed by the SEAF in the method provided in the foregoing embodiment of this application.

An embodiment of this application further provides a computer-readable storage medium. The computer-readable storage medium stores a computer program, and the computer program is executed by hardware (for example, a processor) to perform some or all steps in the method performed by any network element in the foregoing embodiment of this application.

An embodiment of this application further provides a computer program product including instructions. When the computer program product is run on a computer device, the computer device is enabled to perform some or all steps in any one of the methods performed by any network element in the foregoing aspects.

All or some of the foregoing embodiments may be implemented through software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, the description of each embodiment has respective focuses. For a part that is not described in detail in an embodiment, refer to related descriptions in other embodiments.

In the foregoing embodiments, the description of each embodiment has respective focuses. For a part that is not described in detail in an embodiment, refer to related descriptions in other embodiments.

In the embodiments provided in this application, it should be understood that, the disclosed apparatus may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions in the embodiments.

In addition, the functional units in the embodiments of this application may be integrated into one processing unit, or each of the units may exist alone physically, or two or more of the units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or a part contributing to the prior art, or all or some of the technical solutions may be implemented in a form of a software product (that is, a computer program). The computer software product is stored in a storage medium and includes several instructions for instructing a computer device (which may be a personal computer, user equipment, a mobile communications network element, a server, a fixed network element, or the like) to perform all or some of the steps in the methods described in the embodiments of this application. The storage medium includes any medium that can store program code, such as a USB flash drive, a removable hard disk, a read-only memory (ROM, Read-Only Memory), a random access memory (RAM), a magnetic disk, or an optical disc.

What is claimed is:

1. A communication method applied to a target access and mobility management function (AMF), the method comprising:

in response to user equipment (UE) switching from a source slice to a target slice mutually exclusive with the source slice, receiving, by the target AMF serving the target slice, a registration request message from the UE, wherein the registration request message carries network slice selection assistance information (NSSAI) of the target slice requested by the UE;

sending, by the target AMF, a key update service request to an authentication server function (AUSF), wherein the key update service request carries a key input parameter T1 and/or a key input parameter T2;

receiving, by the target AMF, a response to the key update service sent to the AUSF; and obtaining, by the target AMF, a first, AMF key, Kamf_new that is different from a second AMF key, Kamf_old, wherein the Kamf_new is generated based on the key input parameter T1 and/or the key input parameter T2 and the response, and wherein the Kamf_new is a key of the target AMF, and the Kamf_old is a key of a source AMF serving the source slice.

2. The communication method according to claim 1, wherein the registration request message further carries a second key update indication that indicates a network side to update an AMF key, and wherein the target AMF obtains the Kamf_new based on the second key update indication.

3. The communication method according to claim 1, wherein the response carries a security anchor function (SEAF) key Kseaf_new, wherein the key input parameter T1 and/or the key input parameter T2 are/is used to generate the Kseaf_new, and wherein the Kseaf_new is used to generate the Kamf_new.

4. The communication method according to claim 1, wherein the target AMF obtains the Kamf_new in response to a determination that a locally preset key update condition is met.

5. The communication method according to claim 1, wherein the response carries a security anchor function (SEAF) key Kseaf_new and a key input parameter T3, wherein the key input parameter T3 is used to generate the Kseaf_new, and wherein the Kseaf_new is used to generate the Kamf_new; and the method further includes sending, by the target AMF to the UE, a first message that carries the key input parameter T3.

6. The communication method according to claim 1, wherein the key update service request carries a key input parameter T2 and/or the key input parameter T1, wherein the response carries a security anchor function (SEAF) key Kseaf_new and a key input parameter T3, wherein the key input parameter T3 and T1 and/or T2, are used to generate the Kseaf_new, and wherein the Kseaf_new is used to generate the Kamf_new; and the method further includes sending, by the target AMF to the UE, a first message that carries the key input parameter T3.

7. A communication method applied to a target access and mobility management function (AMF), the method comprising:

in response to user equipment (UE) switching from a source slice to a target slice mutually exclusive with the source slice, receiving, by the target AMF serving the target slice, a registration request message from the UE, wherein the registration request message carries network slice selection assistance information (NSSAI) of the target slice requested by the UE;

sending, by the target AMF, a key update service request to a security anchor function (SEAF);

wherein the key update service request carries a key input parameter T1 and/or a key input parameter T2;

receiving, by the target AMF, a response from the SEAF to the key update service request, wherein the response carries a first AMF key, Kamf_new that is different from a second AMF key, Kamf_old, wherein the Kamf_new is generated based on the key input parameter T1 and/or the key input parameter T2 and the response, and wherein the Kamf_new is a key of the target AMF, and the Kamf_old is a key of a source AMF serving the source slice; and obtaining, by the target AMF, the Kamf_new.

8. The communication method according to claim 7, wherein the key update service request carries a key input parameter T2 and/or the key input parameter T1, and wherein the key input parameter T2 and/or the key input parameter T1 are/is used to generate the Kamf_new.

9. The communication method according to claim 7, wherein the registration request message further carries a second key update indication that indicates a network side to update an AMF key, and wherein the target AMF obtains the Kamf_new based on the second key update indication.

10. The communication method according to claim 7, wherein the target AMF obtains the Kamf_new in response to a determination that a locally preset key update condition is met.

11. The communication method according to claim 7, wherein a key input parameter T4 is used to generate the Kamf_new; and
the method further includes sending, by the target AMF to the UE, a first message that carries the key input parameter T4.

12. The communication method according to claim 7, wherein a key input parameter T4 and T2 and/or T1 are used to generate the Kamf_new; and
the method further includes sending, by the target AMF to the UE, a first message that carries the key input parameter T4.

13. A communication method applied to a target access and mobility management function (AMF), the method comprising:
in response to user equipment (UE) switching from a source slice to a target slice mutually exclusive with the source slice, receiving, by the target AMF serving the target slice, a registration request message from the UE, wherein the registration request message carries network slice selection assistance information (NSSAI) of the target slice requested by the UE;
sending, by the target AMF, to a slice authentication and authorization server (AAA-S), a message carrying a key parameter indication,
wherein the key parameter indication indicates to the AAA-S to generate a key input parameter T5;
receiving, by the target AMF, the key generation parameter T5 sent by the AAA-S,
wherein the key input parameter T5 is used to obtain a first AMF key, Kamf_new that is different from a second AMF key, Kamf_old, and
wherein the Kamf_new is a key of the target AMF, and the Kamf_old is a key of a source AMF serving the source slice; and
obtaining, by the target AMF, the Kamf_new.

14. The communication method according to claim 13, wherein a key input parameter T1 and/or a key input parameter T2 are/is further used to generate the Kamf_new.

15. The communication method according to claim 13, wherein the registration request message further carries a second key update indication that indicates a network side to update an AMF key, and wherein the target AMF obtains the Kamf_new based on the second key update indication.

16. The communication method according to claim 13, wherein the registration request message carries a key input parameter T1 that is used to generate the Kamf_new.

17. The communication method according to claim 13, wherein the target AMF obtains the Kamf_new in response to a determination that a locally preset key update condition is met.

18. The communication method according to claim 13, wherein a key input parameter T4 is used to generate the Kamf_new; and
the method further includes sending, by the target AMF to the UE, a first message that carries the key input parameter T4; or
wherein the key update service request carries a key input parameter T2 and/or a key input parameter T1, wherein a key input parameter T4 and the key input parameter T2 and/or T1 carried in the key update service are used to generate the Kamf_new; and
the method further includes sending, by the target AMF to the UE, a first message that carries the key input parameter T4.

* * * * *

UNITED STATES PATENT AND TRADEMARK OFFICE
CERTIFICATE OF CORRECTION

PATENT NO. : 12,015,707 B2
APPLICATION NO. : 17/380961
DATED : June 18, 2024
INVENTOR(S) : Deng et al.

Page 1 of 1

It is certified that error appears in the above-identified patent and that said Letters Patent is hereby corrected as shown below:

In the Claims

Claim 6: Column 44, Line 34: reads as "input parameter T3 and T1 and/or T2, are used to generate" should read as -- input parameter T3 and T1 and/or T2 are used to generate --.

Signed and Sealed this
Fifteenth Day of April, 2025

Coke Morgan Stewart
*Acting Director of the United States Patent and Trademark Office*